United States Patent
Fredriksson

(10) Patent No.: US 9,529,358 B2
(45) Date of Patent: Dec. 27, 2016

(54) REMOTE CONTROL SYSTEM AND METHOD AND USAGE RELATED TO SUCH A SYSTEM

(71) Applicant: KVASER AB, Mölndal (SE)

(72) Inventor: Lars-Berno Fredriksson, Kinna (SE)

(73) Assignee: KVASER AB, Mölndal (SE)

( * ) Notice: Subject to any disclaimer, the term of this patent is extended or adjusted under 35 U.S.C. 154(b) by 0 days.

(21) Appl. No.: 14/441,016

(22) PCT Filed: Nov. 1, 2013

(86) PCT No.: PCT/SE2013/000169
§ 371 (c)(1),
(2) Date: May 6, 2015

(87) PCT Pub. No.: WO2014/074046
PCT Pub. Date: May 15, 2014

(65) Prior Publication Data
US 2015/0301528 A1    Oct. 22, 2015

(30) Foreign Application Priority Data
Nov. 6, 2012 (SE) ...................... 1200677

(51) Int. Cl.
*A63H 30/04* (2006.01)
*H04L 12/40* (2006.01)
(Continued)

(52) U.S. Cl.
CPC ............ *G05D 1/0016* (2013.01); *A63H 30/04* (2013.01); *B64C 39/024* (2013.01); *B64C 2201/146* (2013.01); *B64C 2203/00* (2013.01)

(58) Field of Classification Search
CPC ... G05D 1/0016; G05D 1/0027; B64C 39/024; B64C 2230/00; B64C 2201/146; A63H 39/04; A63H 30/04
See application file for complete search history.

(56) References Cited

U.S. PATENT DOCUMENTS

| 4,537,340 A | * | 8/1985 | Waltzer .................... | A45F 5/00 224/257 |
| 5,551,615 A | * | 9/1996 | McIntosh ................. | A45F 5/00 224/250 |

(Continued)

FOREIGN PATENT DOCUMENTS

| CN | 201747375 U | 2/2011 |
| CN | 102130931 A | 7/2011 |

(Continued)

OTHER PUBLICATIONS

"RealityVision Unmanned Vehicle Service Overview"; A2TECH [online], 2005, [nedladdad Sep. 24, 2013], http://www.a2tech.eu/PDF/A2TECH_RV-Overview_010207.pdf; 28 pages.

(Continued)

*Primary Examiner* — Michael J Zanelli
(74) *Attorney, Agent, or Firm* — Fitch, Even, Tabin & Flannery LLP

(57) ABSTRACT

The invention relates to a remote control system (195) comprising mobile units (190, 1102, 1105), and a by control means (106, 110) provided controller unit for these. Said units are equipped with a function performing means (161) and transferring means (207, 270) that generates information signals (301) respectively transmits the same. Signal processing means (261, 268) and their exerting function (314) for controlling the functions of the respective mobile unit are placed respectively takes place only in the current mobile device. In accordance with the proposed use in connection with the present invention object, a controller area network type of system is constructed with a distributed and integrated network structure (1751). Only signal processing (Continued)

means (1753) and their function exertion means (1754) for controlling of a mobile unit, which is positioned in the actual unit, is used for its control. According to the method establishes a structure of a controller area network type with modular units (1753'), nodes (1753) and a communication protocol (501) for the node communication. All messages transmitted by the nodes are received by the modular units (1754, 1792). A information comparison (1755, 176) is used to select respective message or part thereof.

19 Claims, 18 Drawing Sheets

(51) Int. Cl.
　　*B64C 39/00*　　　(2006.01)
　　*G05D 1/00*　　　(2006.01)
　　*B64C 39/02*　　　(2006.01)

(56) References Cited

U.S. PATENT DOCUMENTS

| | | | | |
|---|---|---|---|---|
| 6,983,128 | B2 * | 1/2006 | Wright | G08C 17/02 455/183.2 |
| 7,219,861 | B1 * | 5/2007 | Barr | A63H 27/02 244/190 |
| 8,452,464 | B2 | 5/2013 | Castaneda et al. | |
| 8,473,140 | B2 | 6/2013 | Norris et al. | |
| 8,874,282 | B2 | 10/2014 | Fredriksson | |
| 9,187,182 | B2 * | 11/2015 | Cathcart | B64D 31/06 |
| 2003/0100271 | A1 | 5/2003 | Wright | |
| 2006/0072531 | A1 | 4/2006 | Ewing et al. | |
| 2006/0192663 | A1 | 8/2006 | Bryan et al. | |
| 2009/0222149 | A1 * | 9/2009 | Murray | A63H 30/04 701/2 |
| 2010/0145551 | A1 | 6/2010 | Pulskamp et al. | |
| 2011/0118903 | A1 * | 5/2011 | Kraimer | B60R 21/0132 701/2 |

FOREIGN PATENT DOCUMENTS

| | | |
|---|---|---|
| DE | 4203055 A1 * | 8/1992 |
| DE | 202004018554 U1 | 2/2005 |
| WO | 9731454 A1 | 8/1997 |

OTHER PUBLICATIONS

CANaerospace—Wikipedia [online], encyclopedia, Wikipedia, the free encyclopedia, Sep. 24, 2012; [nedladdad Sep. 9, 2013]; http://en.wikipedia.org/w/index.php?title=CANaerospace&oldid=514320794; 7 pages.

CAN Aerospace specification; Stock Flight Systems, Stock Flight System, Jan. 12, 2006; Interface specification for airborne CAN aplications; V 1.7; www.stockflightsystems.com/tl_files/.../canaerospace/canas_17.pdf; 58 pages.

CAN Kingdom—Wikipedia [online], Wikipedia, the free encyclopedia, Apr. 17, 2012 [nedladdad Sep. 23, 2013]. http://en.wikipedia.org/wiki/CAN_Kingdom; 3 pages.

Fredriksson, "A CAN Kingdom Rev 3.01" [online], Kvaser AB, 1995 [nedladdad Sep. 24, 2013]. http://www.kvaser.com/images/Papers/ck301p.pdf]; 117 pages.

Jianjun, W., et al., "Digital Research of Unmanned Aerial Vehicle Avionics System Based on CAN Bus", Advanced Material Research vols. 271-273 (2011); Trans Tech Publications, Switzerland; 1 page.

Chow, Mo-Yuen; "Network-Based Control Systems: A Tutorial"; IECON '01: The 27th Annual Conference of the IEEE Industrial Electronics Society; 10 pages, 2001.

CANaerospace-to-USB Gateway A2TECH [online], 2004 [nedladdad Sep. 24, 2013], http://www.a2tech.eu/PDF/CAN-to-USB.pdf; 1 page.

PCT/SE2013/000169 International Search Report dated Feb. 4, 2014; 4 pages.

The State Intellectual Property Office of People's Republic of China; Search Report, Dec. 21, 2015; 2 pages.

The State Intellectual Property Office of People's Republic of China; The First Office Action; Dec. 29, 2015; 6 pages.

\* cited by examiner

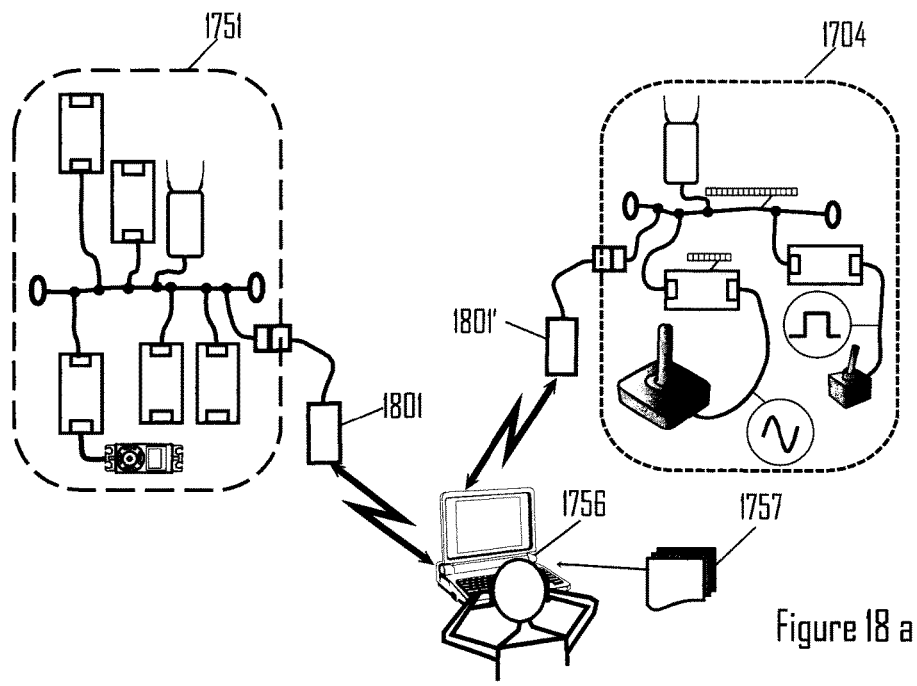
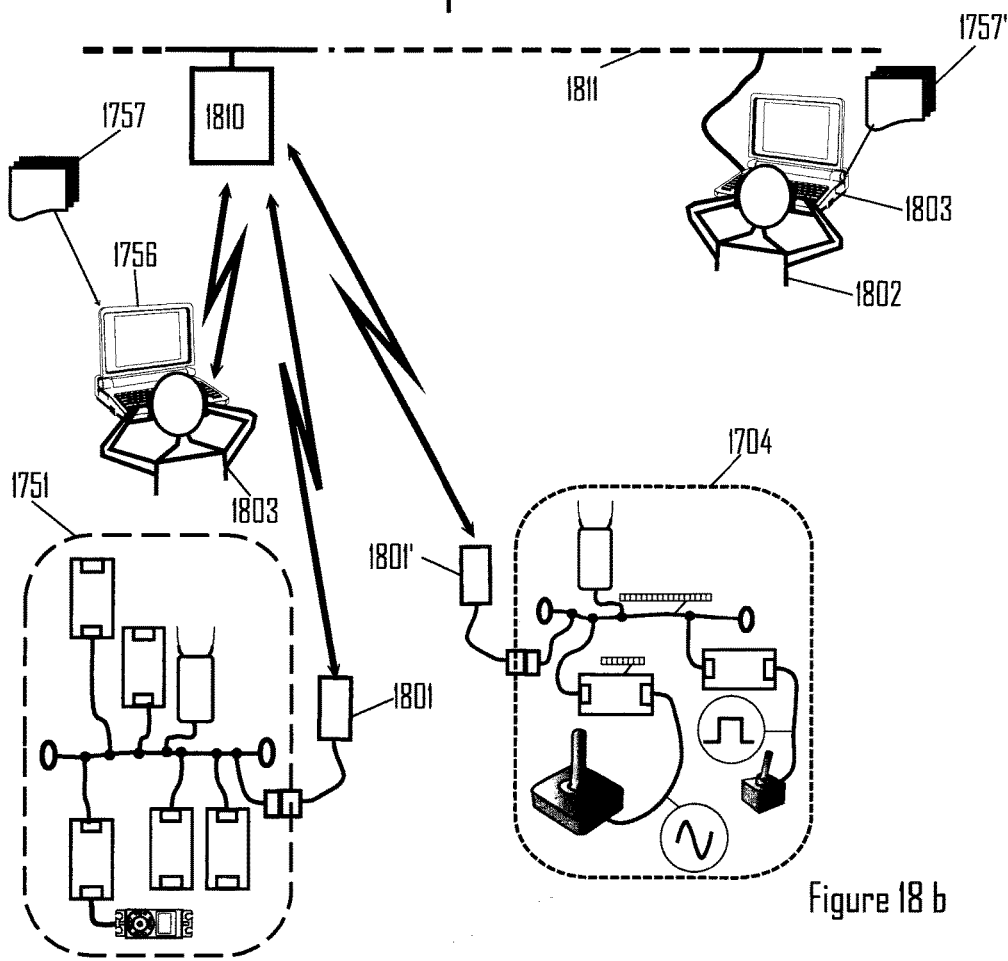
Figure 18 a
Figure 18 b

REMOTE CONTROL SYSTEM AND METHOD AND USAGE RELATED TO SUCH A SYSTEM

CROSS-REFERENCE TO RELATED APPLICATIONS

This application is the National Stage of International Application No. PCT/SE2013/000169, filed Nov. 1, 2013, which claims priority to Swedish Patent Application No. 1200677-1 filed Nov. 6, 2012.

FIELD OF INVENTION

The present invention generally relates i.e. to a remote control system, for example to a radio controlled (RC) system. The invention also relates to a method related to such a system. Said method is i.e. related to a method for controlling radio controlled devices and use of such a system. The invention also relates to a usage of the remote control system.

STATE OF THE ART

Most model control systems are characterized in two main parts, one transmitter of control signals and one receiver of control signals. The receiver is connected to a number of actuators, called "servos," feeding each of them with PWM signals representing setpoint values for positions of the respective actuator. If the model has an electrical motor, this is controlled by a motor speed controller which converts the received PWM signal to a setpoint for the motor speed. The receiver controls a maximum number of actuators and motors, usually ranging between 4 for simple receivers up to 14 or 16 for advanced ones. The numbers are called "channels." The transmitter has a micro controller unit (MCU) by which input signals from joysticks, pushbuttons and potentiometers can be mixed and manipulated in different ways, e.g., making linear joystick input signals non-linear, adjusting the gain of signals, setting min and max values for signals, trim signals, etc. These setting can be made and stored in the transmitter for a finite number of different models, e.g., 7 or 9 or up to 50 in extreme cases. Example of such systems are Futaba 4PK Super2.4 GHz system for cars, SPEKTRUM DX8 for airplanes and helicopters. The weatronic 2.4 Dual FHSS Radio Control System for airplanes and helicopters deviates from the other ones by the possibility to store some model specific data as servo linearity, mixing, etc., in the receiver in the respective model.

Lately a new concept appeared on the market by Futaba launching a technology called S-BUS. The Futaba S-BUS is characterized in that the receiver is controlling the servos via a serial bus on which the setpoint values are distributed as data packages for each position. Each actuator and the speed controller has an address on the bus corresponding to a "channel" number in the traditional systems. Mixing, manipulations and range settings are done in the transmitter as in the traditional systems. By the Futaba solution one and the same receiver can handle as many channels as there are addresses at the same cost. The user does not have to select a receiver with a specific number of channels. Further, the number of cables to connect all servos is reduced, facilitating installation in the model.

A common problem with model specific data stored in the transmitter is known as WMS (Wrong Model Syndrome). Before controlling a vehicle, the pilot has to choose the right model from a list of the stored ones in the transmitter. Selecting the wrong one usually results in a crash. The problem is even greater for a system like the weatronic where similar data can be stored both in the transmitter and the receiver as a modification in the wrong place can lead to a crash even if the selected model at the transmitter is correct. Spektrum programmable transmitters have a solution to the Wrong Model Syndrome called ModelMatch.

ModelMatch assigns each receiver its own unique code when it is paired to a Spektrum transmitter. If the model selected from memory doesn't share the same receiver code as the model to be controlled, the vehicle's controls won't respond until the correct model is selected. A state of the art system is shown in FIG. 1. The example shown relates to an airplane model, but the systems are similar for other model vehicles as helicopters, cars, boats, tanks, etc. A system, shown in principle as 195, consists of a portable transmitter 196 or generating control signals in response to actions by a pilot 197 and a vehicle 198 with a receiver and actuators to be remotely controlled by the pilot 197. A more detailed example of such a system follows: The vehicle 190, here depicted as an airplane, has a receiver 120, a motor controller 163 and a number of servos 161, 162, 164, 165 and 166. The transmitter has two joysticks 110 and 111 controlling 2 axes each, 101, 102 and 103, 104 respectively, trimmers 101', 102' and 103', 104' for trimming respective axis, switches 105, 106, for controlling modes or digital controls as landing gear, potentiometers 107, 108 for semi static controls as flaps and gain. The pilot generates control signals by manipulating the devices 110, 111, and 105 to 108. Typically the signal 101 refers to ailerons, 102 to elevator, 103 to motor control, 104 to rudder, 105 to gear, 106 to dual rates of the ailerons and 108 to flaps. The input signals are read by a micro controller unit (MCU) 150 in the transmitter via the cables 151 connected to respective sensor, the multiplexer 152 and the AD converter 153 The signals manipulated and mixed by the MCU 150 according to one of the schemes 154, 155 or 156 representing stored setups of signal adjustments and mixing for three different vehicles, each modifying control signals for the motor controller 163 and the servos 161, 162, 164, 165 and 166 for a specific model. The mixing and manipulating can be quite complex. The aileron signal should be split into two control signals, one signal for the servo 161 (right aileron) and one for the servo 165 (left aileron), both adjusted with 101' and further modified depending on the position of the switch 106. A 101 signal may also generate a 104 signal. The thus manipulated and mixed pilot input signals are coded by a PPM or PCM method and transmitted by radio transmission 118 from the transmitter 100 to model 190 with the receiver 120 which receives command signals for the motor controller 163 and respective servo 161, 162, 164,165 and 166. The receiver is, via the connector bar 120', connected to the respective servo by three conductor connections (ground, PWM, power) 171, 172, 174, 175, 176, feeding the respective servo with power and control signal. The power source is a battery 177 connected to the motor controller 163 via the cables 178 (+) and 179 (−). The battery voltage is chosen to match the requirements of the motor 170. The motor controller provides power to the receiver 120 with a reduced voltage, usually 5-6 V, via the power and ground conductors and receives control signals via the signal conductor in the connection 173. The receiver then feeds the connected servos with power.

The Futaba S-BUS concept is slightly different. FIG. 1 shows also an alternative configuration 180 of the described system according to Futaba S-BUS. The S-BUS receiver 181 is connected to the serial bus 182. The S-BUS servos and controller 191 to 196 corresponds to the servos and motor-controller 161 to 166 but instead of PWM signals, the receiver transmits messages with the signal value to the respective servo/controller. The control concept is the same, i.e., the transmitter sends control signals to each servo/motor-controller via the receiver. Alternatively traditional servos and controller could have been connected at their respective position at the connector bar 182.

SUMMARY OF THE INVENTION

It is referred to the facts that modern vehicle systems get more and more complex as the performance of MCUs get more and more powerful. Modern actuators have embedded MCUs and a lot of tasks done in the transmitter or receiver could now be distributed to the actuators. It could also be possible to introduce new types of modules dedicated for specific tasks and more advanced control strategies could be introduced. According to the present invention the key to more advanced model control systems is to abandon the concept of gathering a multitude of input signals in the transmitter, manipulating theses to form a signal value for each device in the vehicle and transmitting these values to the receiver for generating a PWM signal to each device connected. The transmitter should instead read the value of each input parameter and transmit these values as signals in digital messages. Each signal or group of signals should be packed in messages associated with a unique identifier. The messages should be transmitted to the model and received by all devices. The respective receiving device should then select the signals in the messages it has to have in order to fulfill its task. In other words, the system uses a distributed embedded network architecture where modules are nodes in a communication system with a communication protocol where all modules connected to the network receive every message and select messages or parts of messages to be processed. The serial protocol CAN (ISO 11898) is used for control systems within automotive and industrial areas and has the basic features for a protocol as described. The ISO 11898 deals only with the low levels of a communication and requires a higher layer protocol (HLP) for making a complete communication protocol. A suitable HLP for remotely controlled model vehicles can be constructed by applying CanKingdom from the Swedish company Kvaser. Adopting CAN as the base for model control systems would give i.a. the following advantages:

a) Any control task can be moved to the vehicle system. This would make the WMS disappear.
b) Simplify the transmitter design as only linear, non-mixed signals are needed.
c) The same transmitter can be paired with several models without any modification.
d) Each device can be prepared for transmitting actual data.
e) Each device in the model can be setup for several modes and all devices can then shift modes simultaneously on one command.
f) Modules can be designed to control old types of servos and speed controllers and new capabilities can be added, e.g., measuring current, voltage, calculating the output PWM signal based on local filters and received data from different sources.
g) The transmitter and the system in the model can be connected directly by wire forming one CAN system. This system can in turn be directly connected to a PC via a CAN interface. This facilitates setup and checking of the system.
h) The respective modules connected to the CAN net can be reprogrammed from a PC.
i) The transmitter could contain several modules forming nodes in a local transmitter network.
k) The transmitter system and model system could be connected by a simple radio transceiver pair. The transceiver pair has only to pack and unpack CAN messages into or from a radio protocol to exchange CAN messages between the then two CAN systems.
l) The transmitter and/or receiver can easily be connected to the World Wide Web.
m) The communication is bidirectional, so information from the mode vehicle can easily be retrieved by the pilot via the transmitter. No need for any additional telemetry equipment.

It is to be understood that both the foregoing general description and the following detailed description are-referred i.a. to possible developments of the invention. The accompanying drawings, which are incorporated in and constitute a part of the specification, illustrate an embodiment of the invention and together with the general description, serve to explain the principles of the invention.

The invention is described i.a. in relation to a construction of a system for remotely controlling model vehicles based on the concept of a distributed embedded control system where input signals, generated for examples by joysticks, pushbuttons, switches, etc. at a R/C transmitter are transformed into CAN messages that are received by the model vehicle and distributed in an internal CAN system. These CAN messages are received by control modules generating control signals to amplifiers connected to servos, motor controllers, switches, etc. needed for controlling the model. Each receiving module is receiving every CAN message and selecting the ones it will need. When the model system is setup, the transceiver and a PC can be connected to one single CAN network. This is then broken up into two separate CAN networks, one for the transmitter and one for the model vehicle. CAN messages are then exchanged between the systems via a radio transceiver pair, preferably working in the 2.45 or 5.8 GHz ISM band, one in the transmitter and one in the model vehicle. As the radio communication is bidirectional, the model vehicle can produce and transmit messages to be received by the R/C transmitter which then can generate actual vehicle information to the pilot.

BRIEF DESCRIPTION OF THE DRAWINGS

A currently preferred embodiments of a system, a method and a usage that have the significant characteristics of the invention will be described below with reference to the attached drawings in which

FIGS. 18a-18b show
examples on the use of common consumer electronic devices in conjunction with systems according to the invention.

DETAILED DESCRIPTION OF THE INVENTION

Figures 1, 1A:
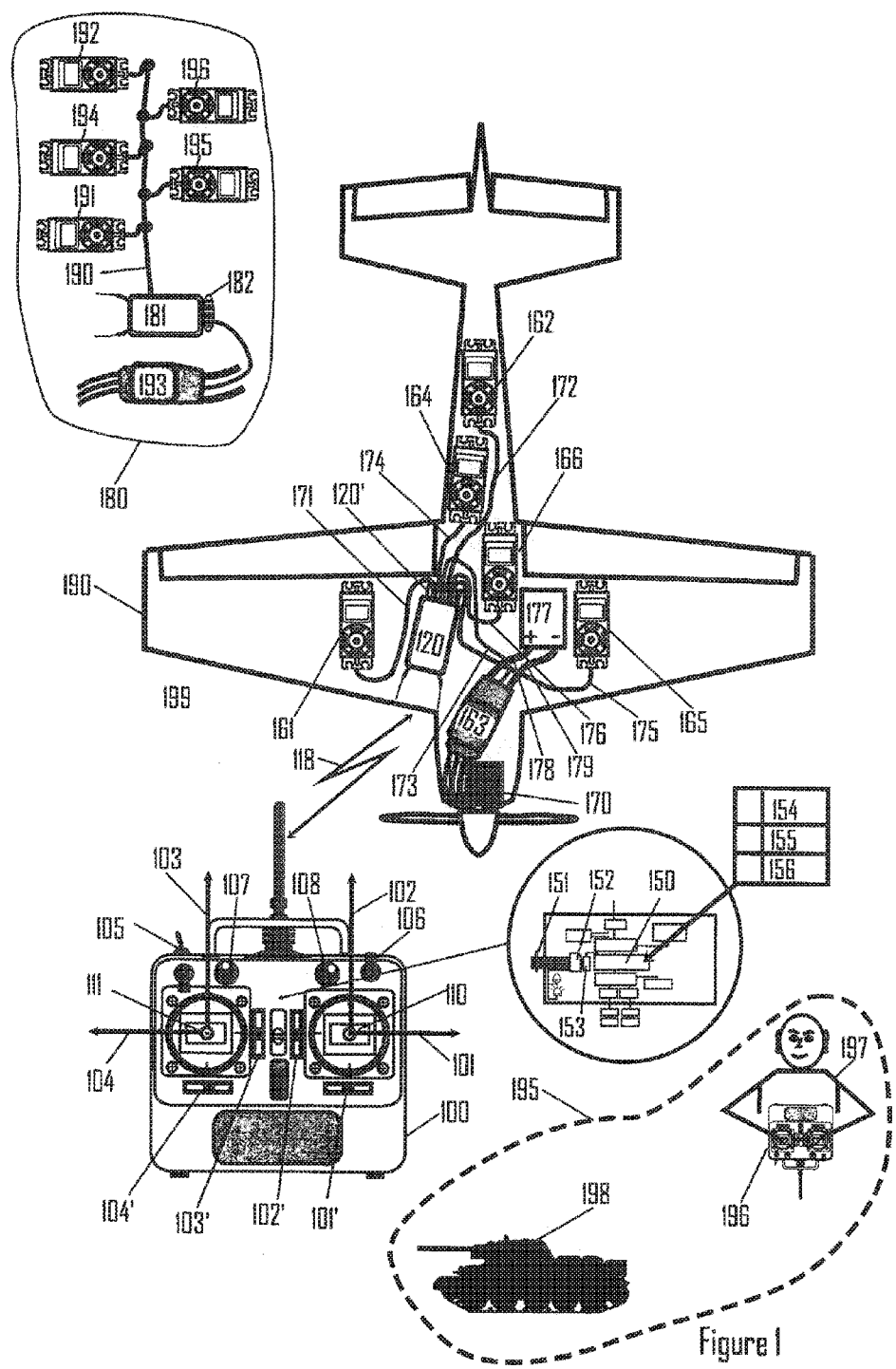
FIG. 1 shows a state of the art R/C system already explained.
FIG. 1A shows an alternating state of the art bus configuration.

The state of the art for remotely controlling model vehicle is a centralized system architecture where any and all modifications of control input signals are made in the transmitter and converted to set point values to each actuator in the vehicle to be controlled. The invention proposes a radical change of the current architecture into a distributed embedded control architecture. FIG. 17 shows an overview of the new concept. Only the essentials are shown as an aid to better comprehend the details shown in FIGS. 2 to 16. The problem to be solved is to design and produce a control system to be used for safely and accurately remotely control a number of model vehicles, one at a time. For clarity, the following part of the overview is divided into five sections:

Transmitter
Vehicle
A wired connection between Transmitter and Vehicle
A gateway connection between Transmitter and Vehicle
A wireless connection between Transmitter and Vehicle
Transmitter and/or Vehicle connection through TCP/IP connections Transmitter A pilot 1701 has a transmitter 1702 that from his point of view as a user works pretty much the same as a state of the art transmitter when controlling a vehicle. The pilot has a number of vehicles 1703 to choose from. The transmitter includes a system 1704 with a number of input devices by which he can produce control signals. Some input devices generate analog signals 1705 as joysticks 1706, potentiometers, etc. These signals are received by an electronic module 1707 that converts the analog signals into digital ones 1708. The module 1707 is connected to a CAN bus 1709. The module puts one or more of its digitalized input values into a CAN message 1710 and transmit the message on the bus. Digital control input 1711 signals from switches 1712, etc., are converted into digital values by a module 1713, that may internally create more info as change of state etc., before composing and transmitting a CAN message on the bus 1709. The transmitter can be very sophisticated with a number of internal sensors and it can receive messages from the vehicle, e.g., speed and fuel level, and present such information to the pilot visually or audibly. The messages on the bus can be received by a module 1715 with the purpose of supervising the activities as well as execute signal processing and create new and modified control messages. There are many ways to transfer the CAN messages to the vehicle side that will be discussed later.

Vehicle

The respective vehicle in the population 1703 has a control system 1751 with a CAN bus 1752 to which a number of modules 1753, 1754, etc., are connected. Such modules can be made to have a very general state at production and be turned to a specific state later by downloaded software. The module 1753' is in a general state with basic software 1755 that includes instructions for communication over CAN. A PC 1756 has a software package 1757 for developing CAN module software, constructing and testing CAN systems, etc. and a USB-to-CAN interface 1758. The module 1753' is connected to the USB-to-CAN interface 1758 and the PC 1757 and downloads 1759 the software by a CAN communication 1760 turning the general module 1753' into a module 1753 specialized for controlling a servo 1761 as well as selecting certain signals in messages appearing on the CAN bus 1752 and turning them into PWM signals controlling the servo 1761. The other modules in the system 1751 may be modified in the same or a similar way.

A Wired Connection Between Transmitter and Vehicle

Both the transmitter system and the vehicle system are built up around a CAN bus. The two buses can be connected to each other by an intermediate three part CAN bus 1770. One connection 1771 is made to the CAN bus 1752, a second 1772 to the CAN bus 1709 and a third connection 1773 is made to the CAN-to-USB interface 1758. The CAN buses 1752, 1770 and 1709 are now connected and forming a joint CAN bus connecting all modules in the vehicle with all modules in the transmitter as well as the PC with each other. All modules have to use the same bit rate and support the same CAN Higher Layer Protocol. A suitable one is the CanKingdom from the Swedish company Kvaser. A system designer 1780 can then configure each connected module and set up the communication in the two systems 1751 and 1704 by using a system configuration software, e.g., the Kingdom Founder from the Swedish company Kvaser, in the software package 1757. Signals are packed in suitable CAN messages and their transmissions are scheduled in a suitable way. Each receiving module is setup to decode relevant messages. Rules for internal message traffic in the respective systems 1751 and 1704 as well as rules for the traffic between the two systems later on are implemented. Any logics can be checked with the two systems connected by wire but the timing of the message traffic and the response time of the actuators may not be correct.

A Gateway Connection Between Transmitter and Vehicle

The CAN bus 1770 is disconnected and replaced by the termination resistor 1774 at the CAN bus 1752 and with the termination resistor 1775 at the CAN bus 1709. The CAN buses 1752 and 1709 are thus terminated in both ends. Each CAN bus has a connector 1762 and 1714 respectively by which external CAN modules can be connected to the bus. The module 1781 is a CAN-to-CAN gateway, i.e., it has two CAN ports 1782 and 1783. A CAN T-connector 1784 is attached to port 1782 and the CAN bus 1770 is now connected to port 1783. The CAN-to-CAN gateway 1785 is mirror wise connected to the CAN bus 1770 and the T-connector 1784'. In this way, the system 1751 is connected to the system 1704 via an intermediate system 1790. The PC 1756 is as earlier connected to the CAN bus 1770 via the CAN-to-USB interface 1758. The PC has two additional CAN-to-USB interfaces 1758' and 1758" connected to the CAN T-connectors 1784 and 1784' respectively. In this way, the PC 1756 is connected to all three CAN systems 1751, 1790 and 1704. The message traffic within the system 1790 can be completely controlled from the PC 1756. The modules 1781 and 1785 can be setup to filter out received messages to be transferred to the other side and time delays of the transmissions can be introduced. In this way, a later radio communication can be simulated. The setups of the other two systems can also be manipulated from the PC. The bit rate of system 1751 can be set differently than 1704 in order to optimize each system, e.g., by introducing oversampling of received signals at the system 1751, redistributing mixing tasks among the modules, etc. The joystick module 1707 could calculate the speed of the joystick movements and add that signal to the message 1710. This information could be used by the nodes in the receiver system 1751 to enhance the quality of oversampled setpoints. Execution times can be measured and verified, latencies varied, failure introduced, etc., by the PC to verify the dependability of the systems 1751 and 1704 separately and combined.

A Wireless Connection Between Transmitter and Vehicle

There are two paired CAN radio transceivers, 1791 and 1792 attached to the respective bus 1709 and 1752 for wireless communication between the systems 1704 and 1751. The radio transceivers are preferably working on the 2.45 GHz or 5.8 GHz ISM band using a frequency hopping or direct spread spectrum modulation technique. They are setup to filter out some CAN messages at the CAN bus 1709 and 1752 respectively for transmission by radio to the other system. Received CAN messages are transmitted on the respective bus. The gateway arrangement is disconnected from the systems 1751, 1704 and from the PC 1756. The message transmissions between the systems are from now on executed by radio, 1791' and 1792', replacing the gateway system 1790. The PC 1756 is connected to the CAN bus 1752 by the interface 1758' connected to 1762 and to the CAN bus 1709 through the interface 1758" connected to 1714. The communication at each system 1704 and 1751 as well as the message interchange between the systems can be monitored and verified by the PC. The setup of the radio transceivers 1791 and 1792 can be modified from the PC and the final system can be optimized and verified.

Transmitter and/or Vehicle Connection Through TCP/IP Connections

Most PCs have a Wi-Fi interface and WIFI routers connected to the Internet are common. FIG. 18 *a* shows one way to use Wi-Fi PC connections for monitoring and/or modifying systems as 1704 and 1751. Here the CAN-to-USB interfaces 1758' and 1758" are replaced by CAN-to-Wi-Fi interfaces 1801 and 1801'. The PC 1756 and the interfaces 1801 and 1801' are organized into an ad hoc network. This configuration can be used pretty much in the same way as with the two CAN-to-USB interfaces described above. Another configuration is shown in FIG. 18 *b*. Here we have a wireless router 1810 connected to the World Wide Web 1811. The ad hoc setup earlier of the PC 1756 and the Wi-Fi interfaces 1801, 1801' are now changed into an infrastructure network setting. The PC 1756 and the systems 1704 and 1751 can now communicate over the router 1810. An operator 1802 at a remote PC 1803 can communicate with the system designer 1804 at the PC 1756 over Internet. The PC 1803 has a software package 1757', essentially the same as 1757 in the PC 1756. The remote operator 1802 can then also be in direct contact with the systems 1704 and 1751 and perform the same exercises as the system designer 1804, i.e., troubleshoot the systems, modify module setups, download software into modules, etc.

The overview above indicates the great possibilities for much more versatile and efficient development methods of R/C systems for model vehicles based on distributed embedded control systems and the protocol CAN. This will result in more efficient systems and is also a base for advanced education and/or demonstrations of control systems in general. The development of full sized systems can be faster and cheaper by using model scale versions at early stages of the development process when different network architectures, bandwidth needs, response times etc. are tested and evaluated. A more detailed description of system and module designs as well as development methods and uses thereof follows below.

Figure 2:
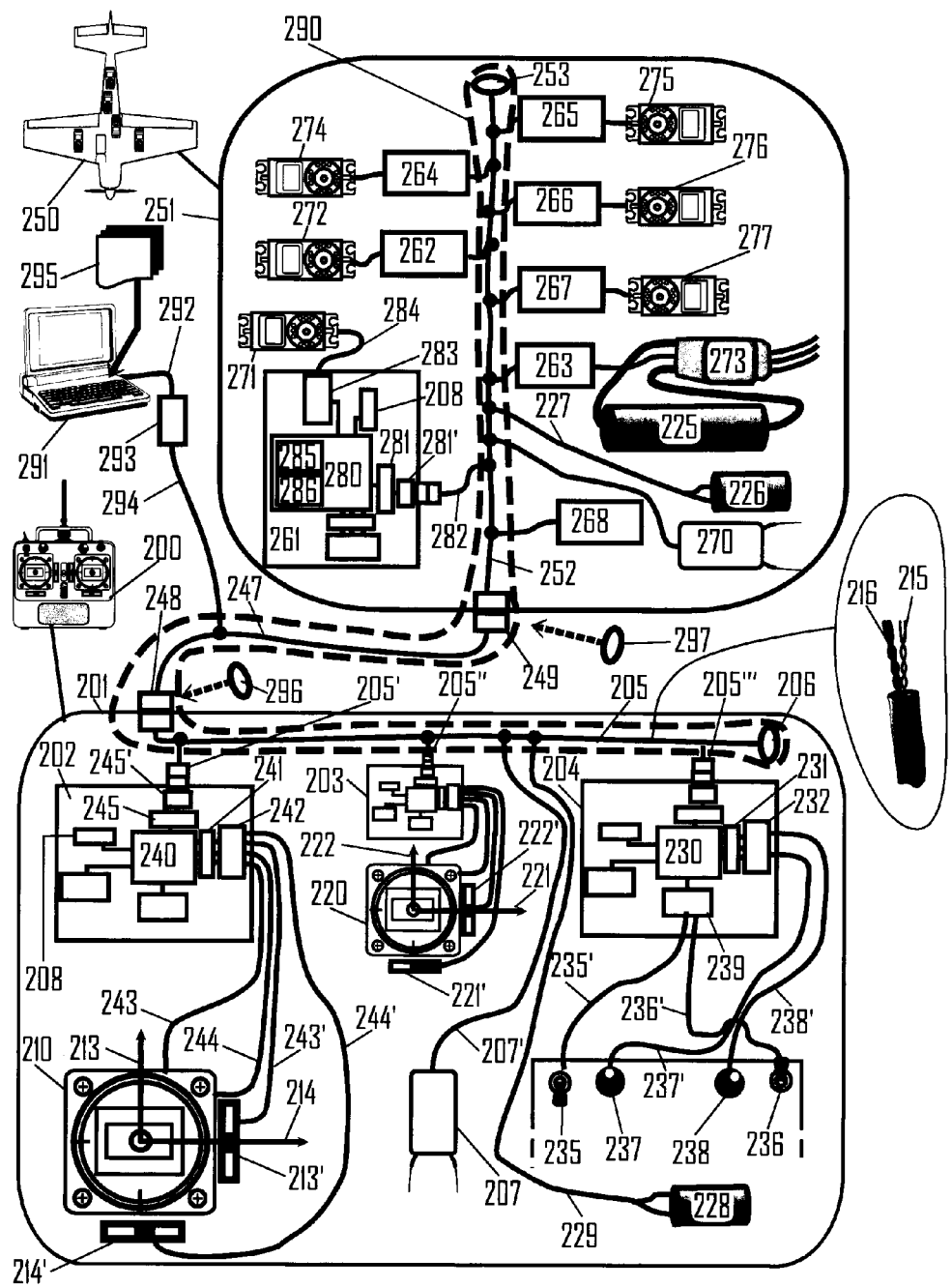
FIG. 2 shows
principally the new system where all modules are connected to a CAN bus, i.e., a wired system.

A solution according to the invention is depicted in FIG. 2 with the transmitter 200 and the model vehicle 250. The interior system of the transmitter and model vehicle is schematically shown as 201 and 251 respectively. In the transmitter system 201, the sensors in the transmitter are connected to separate modules 202, 203 and 204, in turn connected to a CAN bus 205 via the connections 205', 205" and 205'''. A radio transceiver 207 is connected to the CAN bus via the connection 207'. (Such a CAN radio is described in detail in the U.S. Pat. No. 6,467,039 B1.) The module 202 is connected to the joystick 210, module 203 to joystick 220 and module 204 to the switches 235, 236 and the potentiometers 237, 238. The CAN bus is terminated by the resistor 206. The module 202 has a MCU 240, an A/D converter 241 and a multiplexer 242. The joystick 210 axis sensor 213 is connected to the multiplexer 242 by the connection 243. The associated trimmer 213' is in the same way connected to the multiplexer 242 by the connection 243'. The axis sensor 214 axis connected to the multiplexer 242 by the connection 244. The associated trimmer 214' is in the same way connected by the connection 244'. In the joystick 220 the axes 221, 222 and associated trimmers 221', 222' are connected to the module 203 in the same way as joystick 210. The switches 235 and 236 are via the connections 235' and 236' connected to the digital I/O interface 239 of the MCU 230 in the module 204. The potentiometers 237 and 238 are via the connections 237' and 238' connected to the multiplexer 232 and the A/D converter 231 of the MCU 230. The modules 202, 203 and 204 could preferably be hardware-wise identical. The CAN bus 205 includes not only a, preferably twisted, pair of wires 215 for the differential CAN signal levels (CAN_High and CAN_Low) but also another, preferably twisted, pair of wires 216 for power. The transmitter system 201 is powered by a battery with a voltage regulator, schematically depicted as 228, connected two a twisted wire pair 229 in turn connected to the power pair 216 of the CAN bus 205.

The CAN bus 205 of the transmitter system 201 is connected to the CAN bus 252 with the terminator 253 of the model vehicle by the connection 247 via the connectors 248 and 249. The CAN bus 252, the connection 247 and the CAN bus 253 is thus together forming a common CAN bus 290 depicted by a dashed line.

The model vehicle system is built-up around the CAN bus 252 to which the modules 261, 262, 263, 264, 265, 266, 267 and 268 are connected. The CAN bus 252 is of the same construction as the CAN bus 205, i.e., it has one wire pair for signals and another pair of wires for power. A 2.45 GHz radio transceiver 270 (that can be of identical design as 207) is also connected to the CAN bus 252. The servos 271, 272, 274, 275, 276 and 277 are connected to the respective modules 261, 262, 264, 265, 266 and 267. Module 263 is connected to the motor controller 273. A detailed description of the actuator/module/CAN bus connections, valid for all the vehicle modules, follows for the module 261: The module 261 has a MCU 280 that is connected to the CAN bus via the CAN controller 281, the CAN transceiver 281' and the connection 282. The servo 271 is, via the connection 284 connected to the PWM output 283 of the MCU 280. The MCU has a fixed memory area 285 for bootstrapping and communication protocol and a flash area 286 for downloaded applications required at module's node position in the system. The modules 261 to 268 can preferably be identical by hardware and fixed memory area. Not all components needed to build a working module are described as they are obvious to a man skilled in the art. These components are symbolized by 208. The motor controller 273 is powered by a battery 225. The model vehicle system 251 is powered by a battery, preferably with a voltage regulator, schematically depicted as 226, connected via the connection 227 to the CAN bus 252.

The PC 291 is connected to the joint CAN bus 290 via the USB connection 292, the USB to CAN interface 293 and the connection 294. The PC 290 can transmit and receive CAN messages and, with proper software, analyze any transmissions on the bus as well as flash connected modules, simulate transmitter signaling, backup system settings, etc. A system buildup like FIG. 2 is suitable for programming (flashing) the respective modules and for sending setup messages according to CanKingdom from the PC with a suitable software package symbolized by 295. Inputs from the transmitter 200 can be visualized on the PC and actual servo responses in the model vehicle can be checked. When everything is found correct, the connection 247 is replaced by the terminators 296 and 297 at the respective connections 248 and 249. We have now two separate CAN systems, one 205 terminated by 206 and 296 in the transmitter 200 and one 252 terminated by 253 and 297 in the model vehicle 250.

Figure 3:
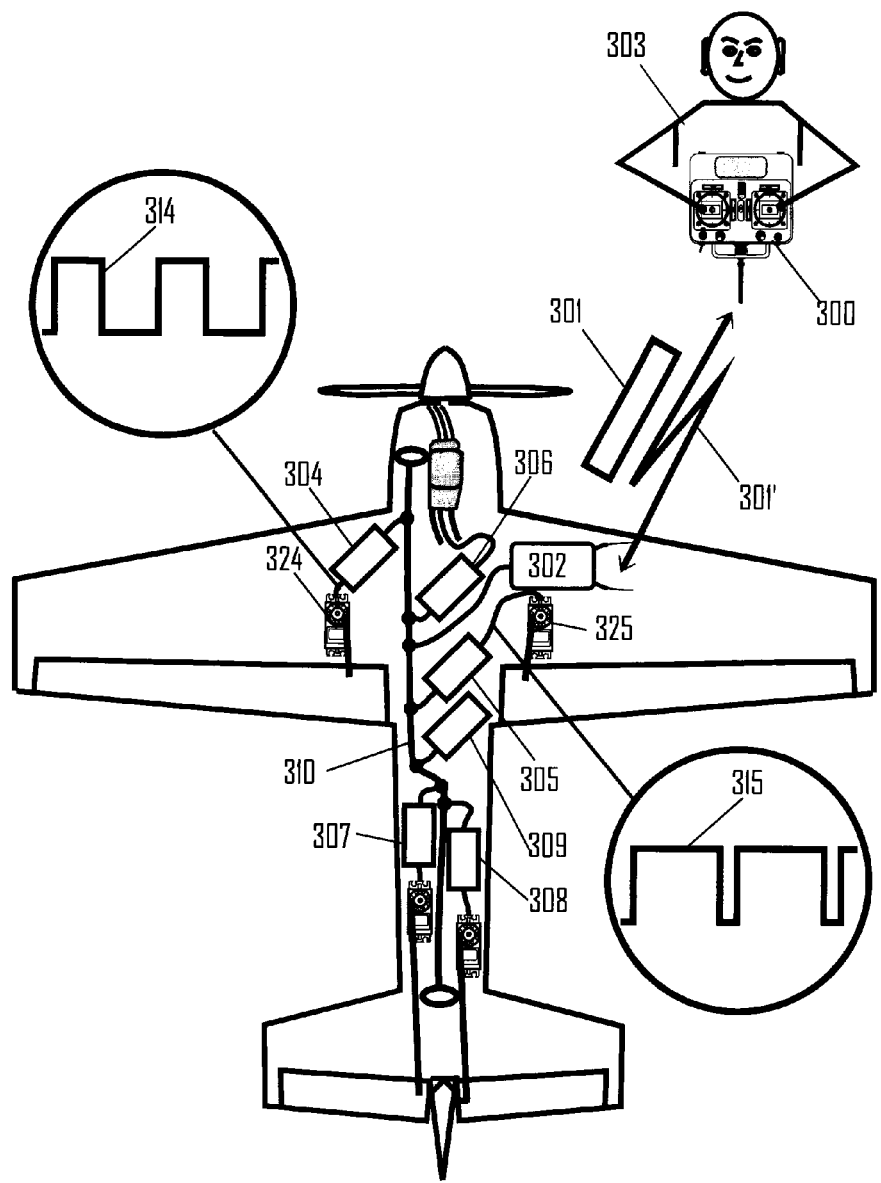
FIG. 3 shows
a system according to FIG. 2 which has been divided into two separate CAN systems connected to each other via a wireless connection.
Figure 4:
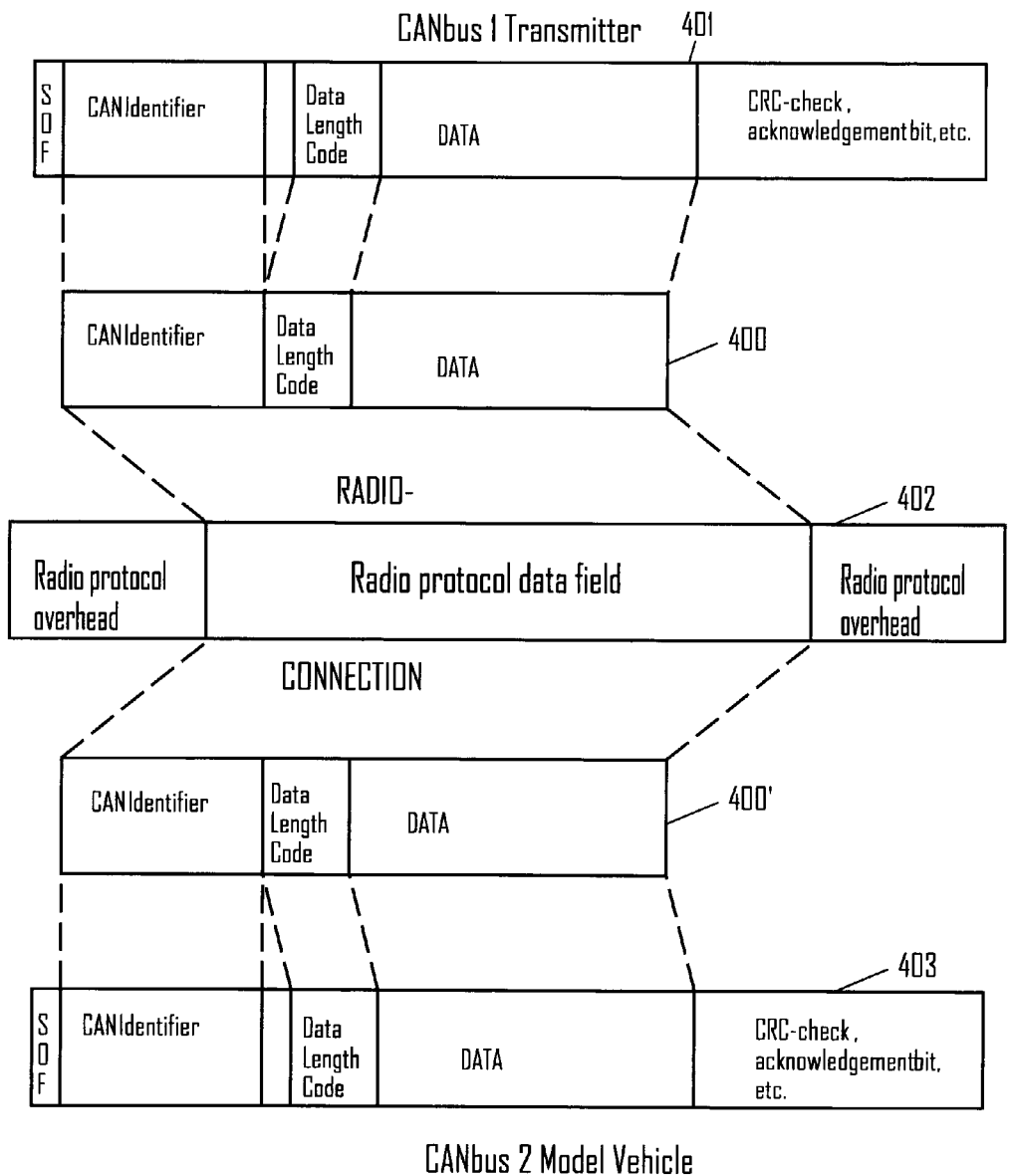
FIG. 4 shows
the radio communication of CAN messages between transmitter and the model vehicle in principle.

FIG. 3 shows the separated transmitter and vehicle systems. The pilot commands are turned into CAN messages internally by the transmitter 300 and transmitted embedded in a radio protocol information package 301 by radio signals 301' which are received by the radio transceiver 302. The radio protocol information package is shown in principle in FIG. 4. The essentials 400 of a CAN message 401 on the transmitter side is stripped out and embedded in a radio protocol 402 at the transmitter side. The receiver extracts the CAN message essentials 400' and recreate the CAN message 403 and transmits it on the CAN bus at the model vehicle side. The technology is explained in detail in the U.S. Pat. No. 6,467,039 B1. The radio transceivers are shown as 207 and 270 in FIG. 2 and acts as a bridge for CAN messages between the transmitter and the model vehicle. The position of the input organs as joysticks, trims, switches, potentiometers manipulated by the pilot 303 are read periodically by the modules 202 and 203 in FIG. 2, e.g., 100 times per second, for actual values of the sensors 221, 221', 222, 222', 213, 213' and 214, 214' with a twelve bit resolution. The respective module 202, 206 and 204 put these values into CAN messages. This can be done in different ways. All modules are supporting CanKingdom that allows a system designer to create CAN messages as he likes. The modules in the model vehicle will select the messages each of them is programmed to receive and calculate new control signals according to preprogrammed algorithms. There several ways to design a vehicle control system by distributing the task of mixing and manipulating signals to different modules. The module 304 in FIG. 3 controls the left hand aileron, the 305 the right hand aileron, the 306 the motor, the 307 the elevator, the 308 the rudder. The module 309 is a system module that can take care of tasks not suitable for local execution in the other modules. All modules are connected to the CAN bus 310 and thus forming specialized nodes in the CAN system.

Figure 5:
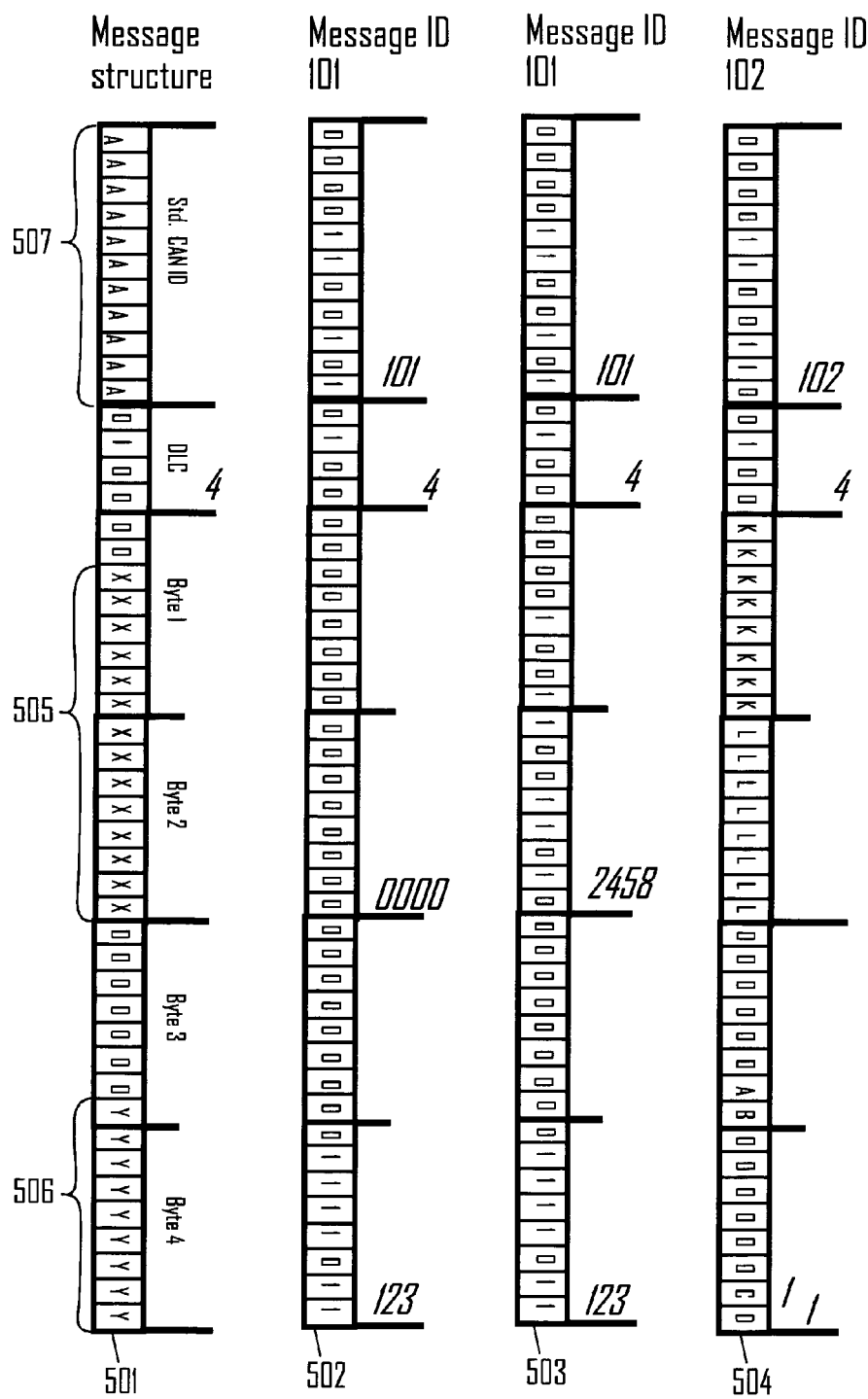
FIG. 5 shows
principles for CAN message coding.

An example of a CAN message with joystick commands is shown as 501 in FIG. 5. Each axis has to get its own unique CAN ID. The Standard CAN identifier (Std_ID) A, 507, is assigned for the joystick axis value X position 505, and its trim value Y position 506. The axis value and the trim value have to be assigned a data type and a data format, e.g., unsigned integer and bits for the axis and signed integer and bits for the trim value. The maximum range for the joystick signal is 4096, i.e., 12 bit resolution, and the trim signal is 512, i.e., ⅛ of the joystick range. For a byte oriented presentation of the values, four bytes are needed. The CAN Data Length Code (DLC) will then be 4. The position value X is placed in the first two data byte (first word) and the trim value Y in data in byte three and four (second word).

The invention will be further explained by an example based on an aileron command. The assumption is that the servo control signal should be reduced 20% if the dual rate switch, e.g., 236, is in position "on" and the aileron going downwards should reduce the signal 50% to reduce drag. The pilot has generated a joystick trim of 6% to the right to make the model airplane flying straight. This generates a trim signal of 123 ($00000111 1011_b$) generating the message 502 in FIG. 5 by the module 203 in FIG. 2. The pilot moves the joystick 20% to the right generating a signal 2048*1.2=2458 ($100110011010_b$) shown as message 503. (The module 202 is following the same scheme generating messages in response to pilot inputs.) The third module 204 generates message 504 with the CAN Identifier 102 and uses two bytes for the two potentiometers 237 and 238 indicating the position values K in byte 1 and L in byte 2, and two bits in the byte 3 indicating the state A of the switch 235, A=0 as "off", A=1 as "on", and change of state B, B=0 false and B=1 true. The switch 236 is indicated the same way in byte 4 with C and D. In this example, the pilot has switched the switch 236 to "on" and then C=1 and D=1. (The coding can be done in a more compressed way by omitting the byte pattern but this is beyond the scope of this invention.) The system can be more complex with more sensors and switches but the principles will stay the same. The CAN protocol allows for some five hundred million unique identifiers if Extended ID is used. The radio transmitter 207 embeds the CAN messages into the radio protocol package 301 and transmit the radio signals 301'.

The process at the transmitter side is now described and we move to the receiving side. The radio signals are picked up by the radio transceiver 302 and the CAN messages are filtered out from the radio protocol package and placed on the CAN bus 310. Here the system module 309 (same as 268) picks up the messages 502, the actual aileron command, and the potentiometer/switch/push button message 504 to perform the following task:

1 Generates an actual neutral signal value 2171 by adding the trim signal value 123 to the nominal neutral signal 2048.
2 Reads the joystick signal (2458) and deduct the actual neutral signal (2171) forming an actual control signal (287).
3 Reads the dual rate switch signal (on) and accordingly multiplies the control signal (287*0.8=230).
4 Calculate the signal for the right hand aileron servo 305. The model should turn to the right, i.e., the rudder should go upwards and thus have the full signal neutral+230. The signal value will then be 2171+230=2278 ($100011100110_b$)
5 Calculate the signal for the left hand aileron servo 304. The model should turn to the right, i.e., the rudder should go downwards and thus have the signal reduced by 50%, then neutral 2171-230/2=1933 ($11110001101_b$).
6 Generate two new CAN messages with a two byte control signal, the message 601 in FIG. 6 with CAN ID 901 for the right hand aileron servo 305 and the message 602 with CAN ID 902 for the left hand servo 304.
7 Transmit the messages.

Figure 6:
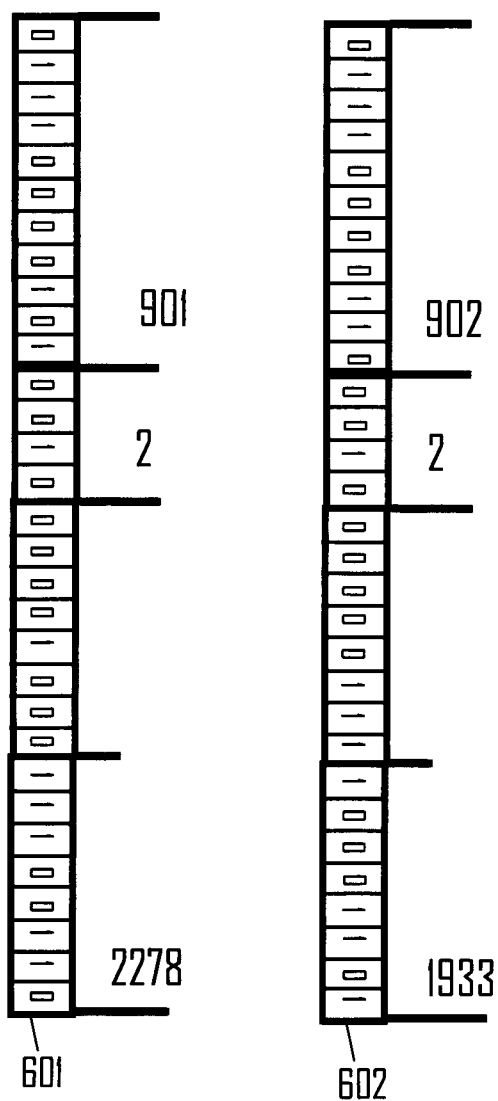
FIG. 6 shows
example on CAN message coding.

Now the right hand aileron module 305 receives message 901, depicted as 601 in FIG. 6, and generates the proper PWM signal 315 to position the servo 324 and the left-hand aileron module 304 receives the message 902, depicted as 602 in FIG. 6, and generates the PWM signal 314 to the servo 325.

An alternative to the scenario above could be that both modules 305 and 304 had picked up the messages 502, 503 and 504 in FIG. 5 and been preprogrammed to do the steps 1 to 5 respective 1 to 4 and 6 above of the module 309. The mixing task is then distributed to the actuator nodes in the system.

It has now been shown that replacing an address based protocol with a content based protocol for model vehicles opens completely new possibilities for different system architectures even for simple systems as described. Signal generating modules does not have to be designed with specific receivers in mind. A module connected to the bus could provide just one signal or a multitude of signals. Each receiving module picks up the signal it needs. The signal modifications could have been much more complex involving an exponential response on the joystick command, mixing aileron and rudder signals, etc. The important thing is that the modifications needed to a great extent are dependent on the qualities of the model vehicle, not the transmitter. The WMS (Wrong Model Syndrome) is solved once and for all in a foolproof way as all signal modifications are made in the model vehicle.

Figure 7:
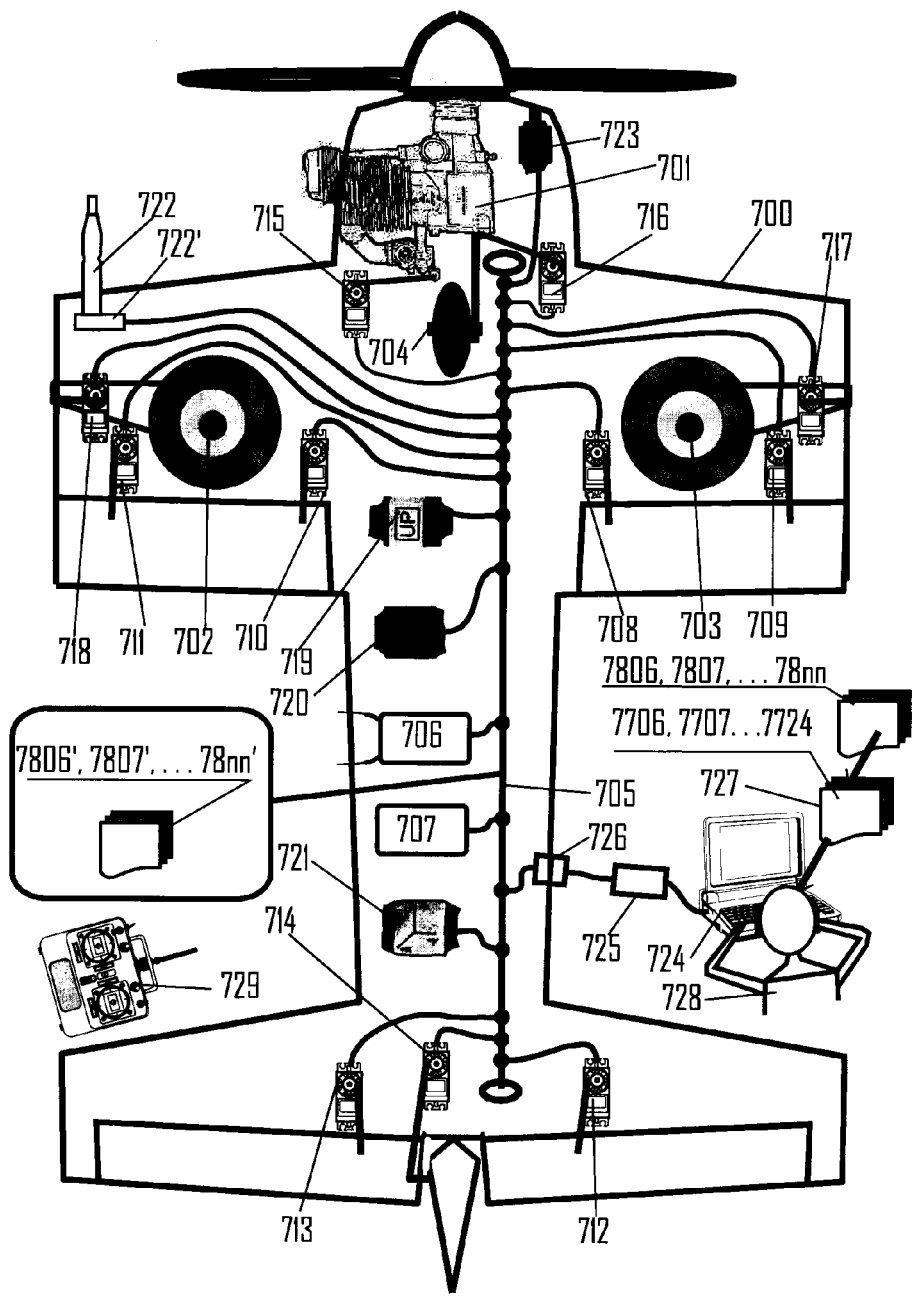
FIG. 7 shows
an implementation of the invention.

The advantage of the invention is even more obvious for more advanced model vehicles. It is readily apparent that the modules can be integrated into actuators and sensors designed for a system according to the invention. FIG. 7 shows a model aircraft 700 with an engine 701, a left hand main gear 702, a right hand main gear 703, a nose gear 704 and a CAN bus 705. The following modules are connected to the CAN bus: A radio transceiver 706, a system module 707, two right aileron servos 708, 709 and two left hand servos 710, 711, two elevator servos 712, 713, a rudder servo 714, a throttle servo 715, nose landing gear servo 716, right landing gear servo 717, left landing gear servo 718, GPS module 719, variometer 720, three axes accelerometer 721, a pitot tube 722 with electronics 722' and a RPM sensor 723. All devices connected to the CAN bus have electronics supporting their main task as well as communicating via CAN according to the CanKingdom protocol. The PC 724 is temporarily connected to the CAN bus 705 via the CAN bus interface 725 and the connector 726. The PC 724 has a system design software package 727 supporting CanKingdom. For each module, this software has a description 7706, 7707, . . . 7724 of its capabilities, including lists of all signals the respective node can transmit and lists of all signals the respective node can receive. With the software 727, e.g., Kingdom Founder from the Swedish company Kvaser, a system designer 728 can construct CAN messages 7806, 7807, . . . 78nn, with unique CAN identifiers and for each message decide the transmitting node and receiving nodes. The system designer 728 then instructs the software 727 to transmit setup messages to each node by which they are modified to code and decode the constructed CAN messages. To make this process possible, all modules connected to the CAN system have to support a CAN Higher Layer Protocol suited for the task. One such a protocol is CanKingdom from the company Kvaser in Sweden.

When the system designer in this way has set up the system, he can verify that the system it is correctly set by connecting to a transmitter 729 and physically manipulate the transmitter controls and see that the model servos is responding correctly by observing the movements of the rudders, the motor rev, flaps, gear, etc., in response to the manipulation of the respective input organs of the transmitter. He can use the PC and transmit simulated messages 7806', 7807', . . . 78nn' from the transmitter 729 and the devices 706 to 722 and see what they will do during a flight to verify correct response from the rest of the system.

Figure 8:
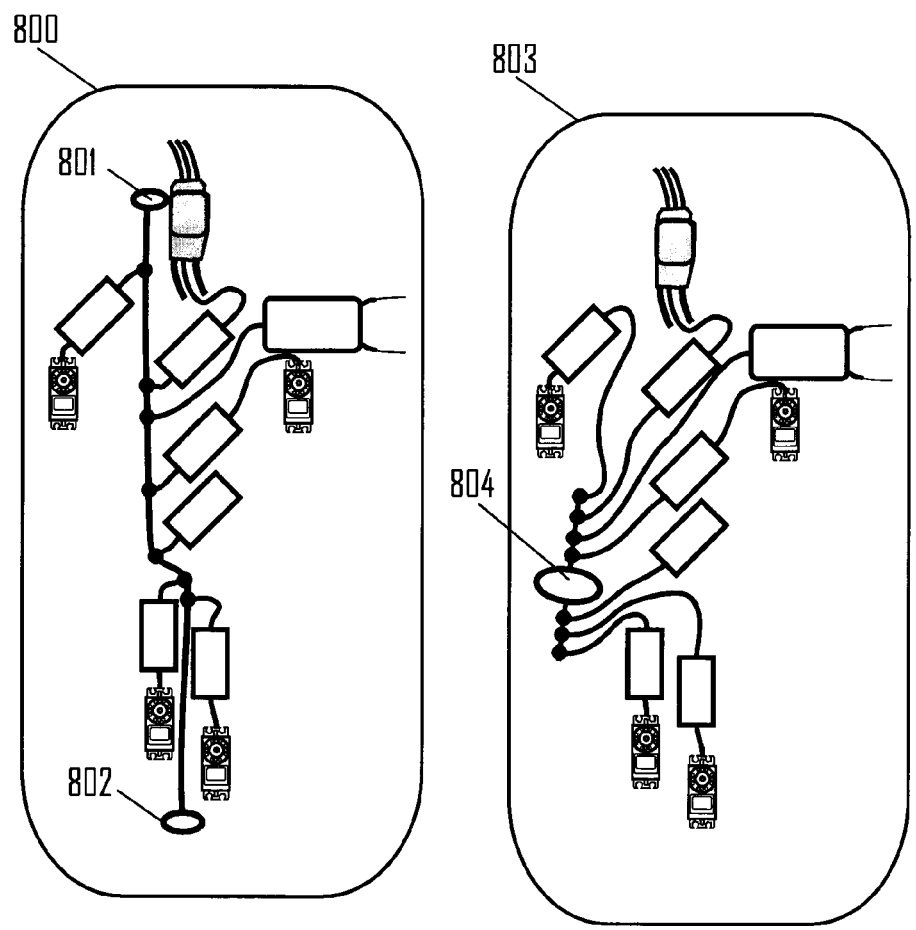
FIG. 8 shows
two alternative topologies for a CAN model vehicle system.

A system as described in FIG. 3 is depicted as 800 in FIG. 8. The CAN protocol standard specifies a bus topology and the length of the bus is limited due to wave propagation. The higher bit rate, the shorter bus length. For 1 Mbps, the max length is approx. 25 m and for 250 kbps approx. 250 m. The standard also requires 120 Ohm terminators at each end, 801 and 802, to suppress reflections. Compared with this, distances within an R/C transmitter and a model vehicle are very short. This fact allows for a star topology 803 with a central terminator 804 of 60 Ohm as shown in FIG. 8. Due to the short distances reflexing waves will be quickly dampened and the systems will work flawlessly. Several other deviations from the standard ISO 11898 can be made and the system would still work properly, e.g., increasing the resistance value of the terminators and/or lowering the signal voltage to lower power consumption, simplify the CAN transceiver design to lower cost, etc.

One advantage when using modules as described earlier in FIG. 2 as 261 to 267 is to power the servo or motor controller through the module. In its simplest form, the current can be measured and reported. In a more advanced form, the module could control local battery systems with different voltage at different nodes. In its most advanced form, it would be totally integrated in the device.

Figure 9:
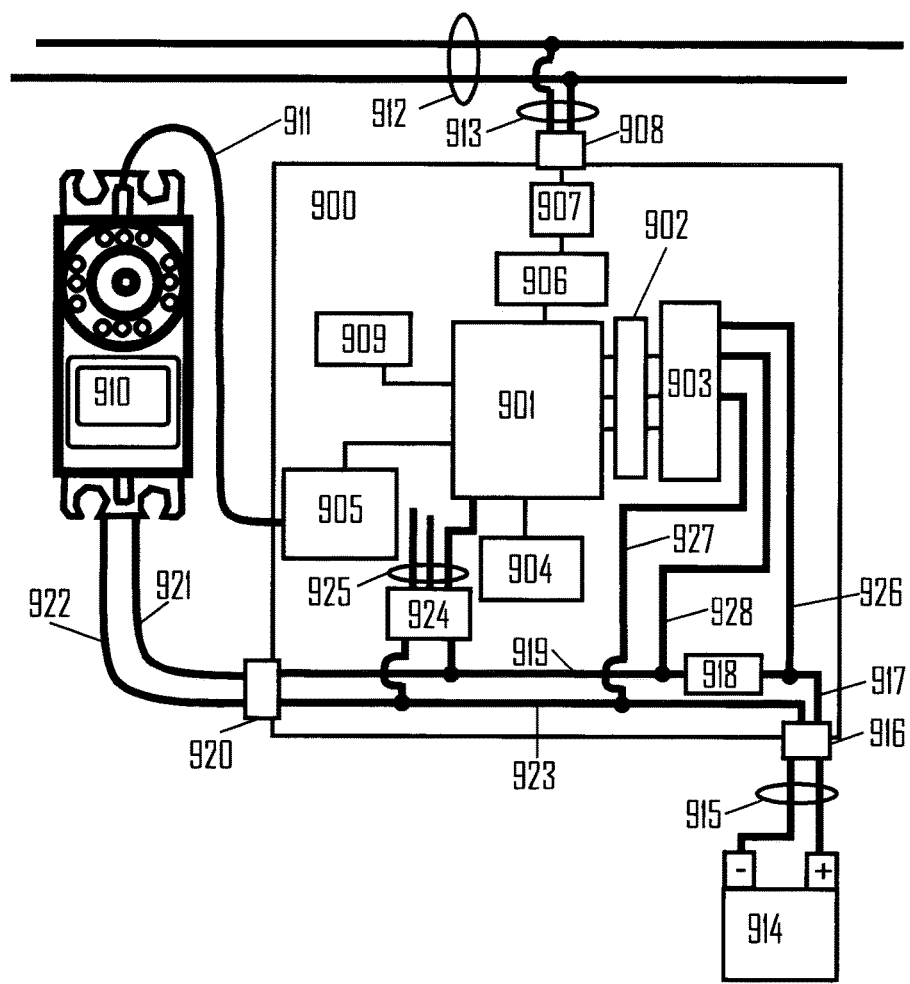
FIG. 9 shows
a local servo/module solution with the power supply explained.

FIG. 9 shows a module 900 with a MCU 901, an A/D converter 902 with a multiplexer 903, a digital I/O 904, a PWM output 905, a CAN controller 906, a CAN transceiver 907 and a CAN connector 908. Other components required are symbolized with 909. The PWM output is connected to the servo 910 by the connection 911. The CAN transceiver is connected to the CAN bus 912 via the connector 908 and the connection 913. The module 900 is connected to a battery 914 by the connection 915 and the connector 916. From the connector, the current is flowing through the strip 917 connected to a low ohm resistor 918 connected at the other side to the strip 919, through the connector 920 and the connection 921 feeding the servo 910 and back to the batter 914 through the connection 922, the connector 920, the strip 923, the connector 916 and the connection 915. The module itself is fed from the strips 919, 923, through a voltage regulator 924 providing necessary voltages 925. The strips 917 and 923 are connected to the A/D converter 902 via the connections 926 and 927 and the multiplexer 903. Then the MCU 901 can measure the incoming voltage. The MCU 901 can also measure the voltage over the resistor 918 via the A/D converter 902, the multiplexer 903, the connections 926, 928 and calculate actual current flowing from the battery, e.g., if the resistor 918 is 0.1 ohm and the voltage over the resistor is measured to 0.1 V, the current is 1 A. With 7.4 V as battery voltage, the power would be 7.4 W. The MCU can then calculate and/or report/store current and power as well as more advanced tasks as indication of servo endpoints, rudder flutter etc. based on analysis of actual current/power and setpoint values. These results can then be distributed via the CAN network.

Figure 10:
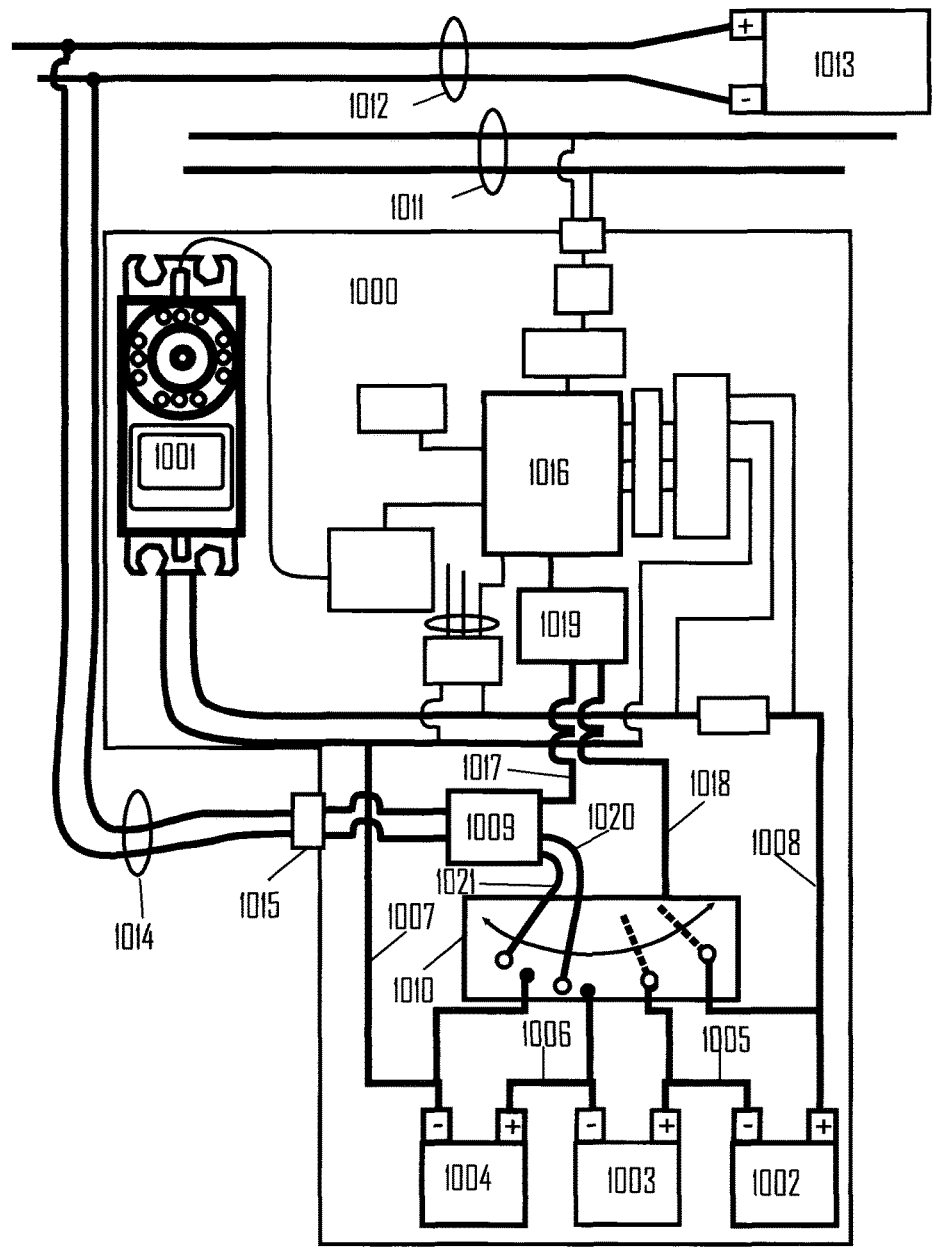
FIG. 10 shows
an advanced power system according to the invention.

It is readily apparent that each actuator (servo), motor-controller or sensor can have a module function as described integrated into its electronics. As any available information can be exchanged throughout the network via the CAN bus, this opens up for a distributed power system as well. Different units require different voltages and current. Sensors typically could do with 3.7V, servos with 7.4 V but motors would often need 11.1 or 14.8 V or even more. FIG. 10 shows a module 1000 and an integrated high power servo 1001 having its own power system of three battery cells 1002, 1003 and 1004, each with a nominal voltage of 3.7V. Through the connections 1005 and 1006, they are coupled in series giving a nominal voltage of 11.1 V to the module via the connection strips 1007 and 1008. The module has also a battery charging unit 1009 optimized for charging one battery cell. Each cell is connected to the multiplexer symbolized by 1010 by branches of the strips 1005, 1006 and 1007. In parallel with the CAN bus 1011 is a power line 1012 connected to the power source 1013 that can be optimized for supplying the system with the continuous average power the system needs, but not peak currents. The local batteries or super-capacitors will take care of that. The power source can be of different kinds, e.g., solar cells, fuel cells, high capacity battery, etc. The power source 1013 delivers 5 V on the bus and feeds the battery charger 1009 via the connection 1014 and the connector 1015. The MCU 1016 can communicate with and control the battery charger 1009 and the multiplexer 1010 via the digital connections 1017 and 1018 respectively connected to the digital I/O 1019. The multiplexer 1010 connects the charger 1009 to the cells 1002, 1003, 1004 one by one via the symbolically movable connections 1020 and 1021 by command of the MCU through the connection 1018. The MCU can read actual charging status from the charger 1009 via the connection 1017 and tries to keep them fully charged.

Figure 11:
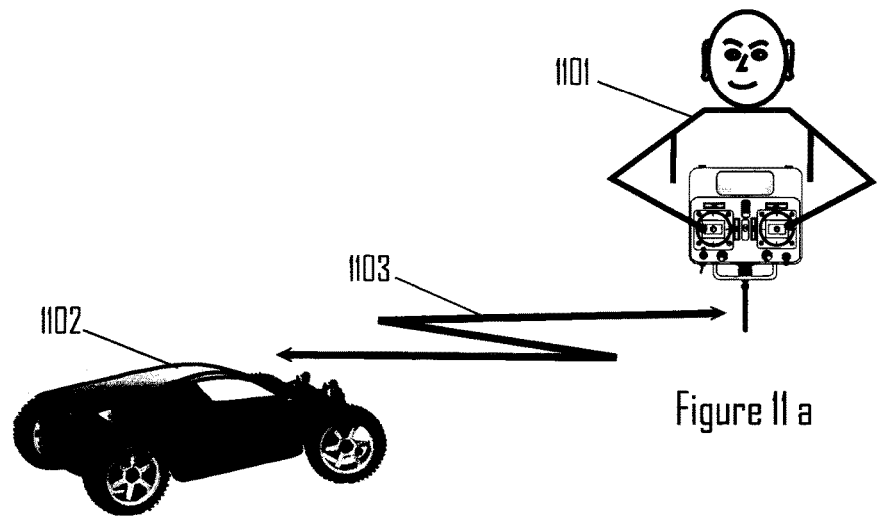
FIG. 11 shows
example on use cases.
Figure 11:
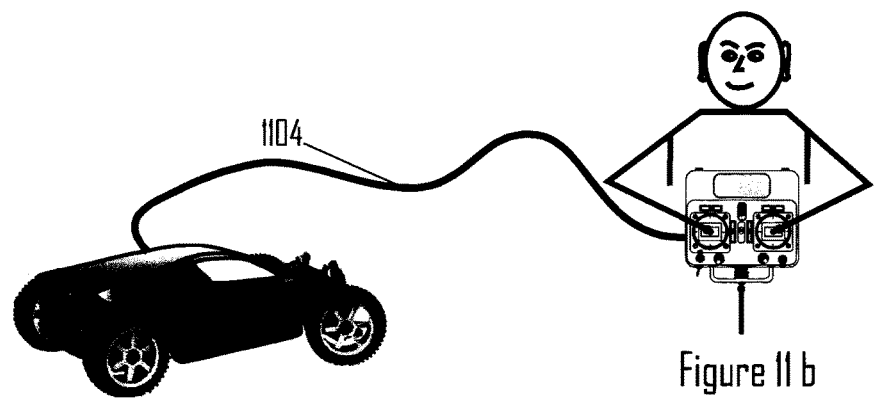
Figure 11:
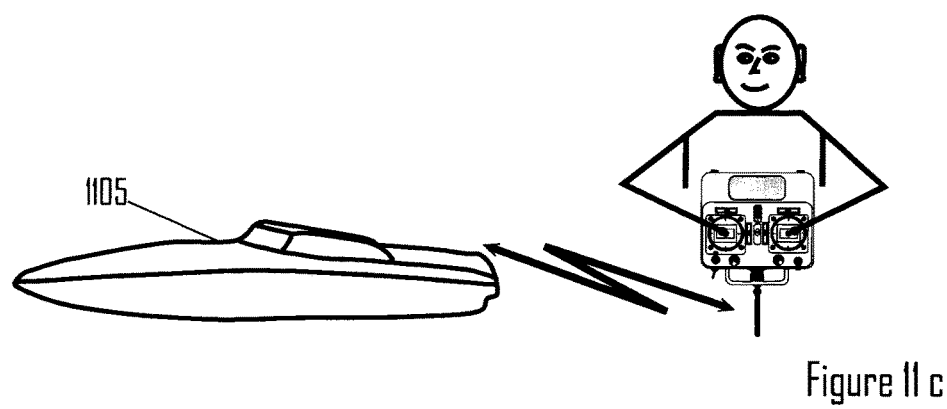

The invention has been described for an R/C airplane system, but can be applied on any model vehicle as car, boat, hovercraft, etc. For ground bound vehicles, e.g. a car, it is great advantage that it is easy to shift between a wired and a wireless connection between the transmitter and the vehicle. The bandwidth of a wireless connection is usually lower than a wired connection. FIG. 11 a shows a pilot 1101 controlling a car 1102 via a wireless connection 1103 in the same fashion as the airplane in FIG. 3. FIG. 11 b shows the same pilot and car, but here the wireless connection is replaced by a wired CAN connection 1104 as previously described as the connection 247 in FIG. 2. FIG. 11 c shows the same pilot controlling a boat 1105.

Figure 12:
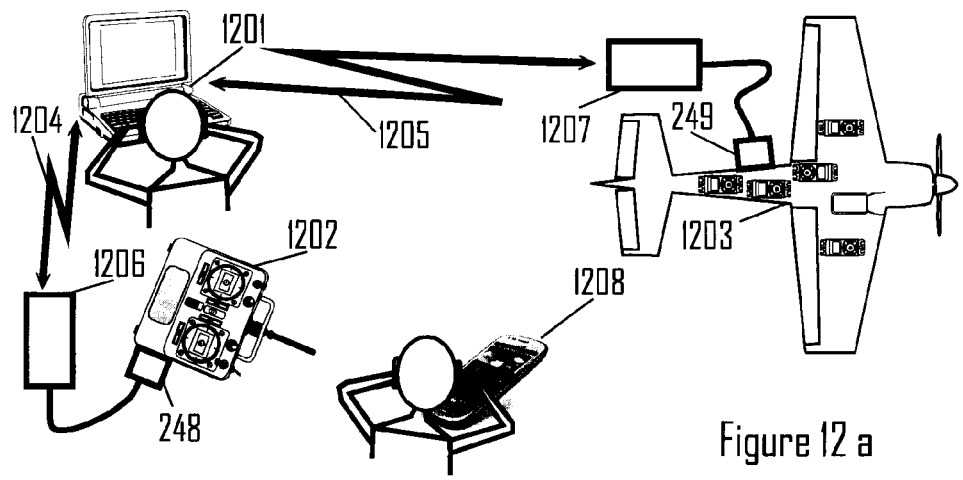
FIG. 12 shows
remote manipulation of transmitter and vehicle systems according to the invention.
Figure 12:
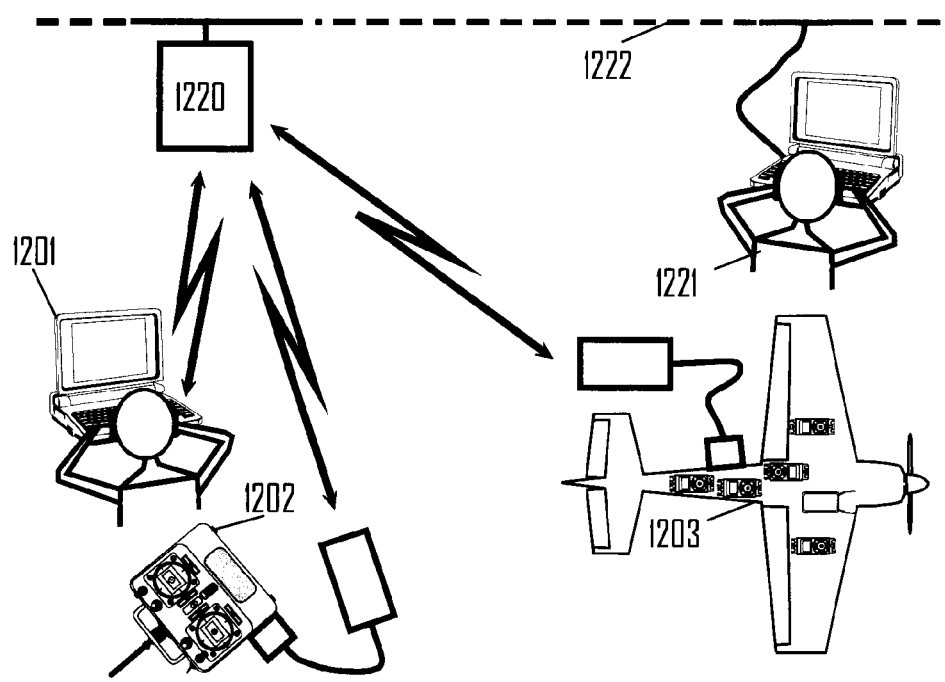

Another advantage of using CAN for model vehicle control systems is that a lot of products intended for other markets and technologies can be used. Most PCs and similar products have a built-in Wi-Fi interface. FIG. 12 a shows the PC 1201 connected to the transmitter 1202 and the vehicle 1203 via Windows ad-hoc network connections 1204 respectively 1205. This is made possible by connecting a CAN-to-Wi-Fi unit 1206 to the CAN connector 248 at the transmitter and another one 1207 to the CAN connector 249 at the vehicle earlier described in FIG. 2. An example of a CAN-to-Wi-Fi unit is the "BlackBird" from the company Kvaser. FIG. 12 b shows an alternative solution where all units are connected to a Internet Hotspot 1220. Then a remote person 1221 via an Internet connection 1222 gets connected to the units 1201, 1202 and 1203. It is readily apparent that the PC may be substituted by a smartphone 1208 or similar device and that the remote communication may use a Bluetooth connection in many instances of the described procedure.

Figure 13:
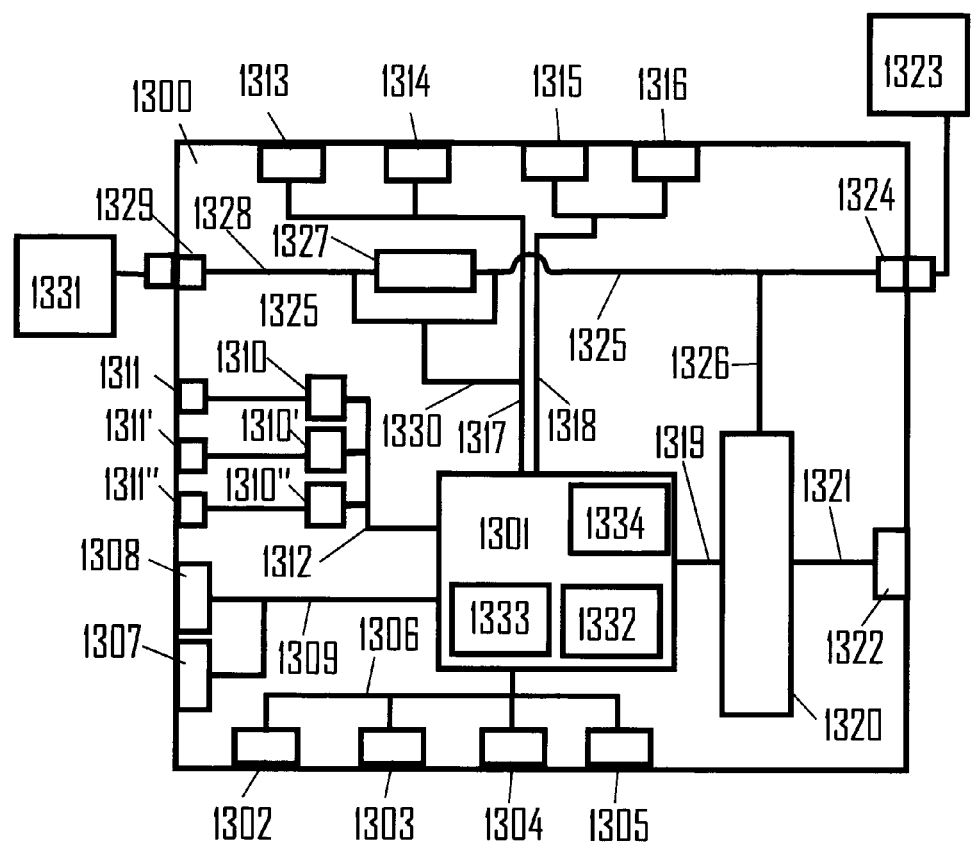
FIG. 13
shows the principal construction of a general purpose module according to the invention.

As mentioned earlier, a module may be designed to be very flexible and intended for general purposes during early stages of system development. FIG. 13 shows a principal design of such a general module. A suitable MCU for the module is the STM32F205VE from STMicroelectronics. It has a great variety of inputs and outputs, timers, protocols, etc. It has also a unique 96 bit identifier that can be used as a serial number of the module. The module 1300 has an MCU 1301 that is connected to two CAN ports, 1302 and 1303, one LIN port 1304 and one USB port 1305 via the connections 1306. Attached to the MCU 1301 are also two PWM output ports 1307 and 1308 via the connection 1309. Furthermore, three thermocouple chips 1310, 1310' and 1310" are connected to the terminals 1311, 1311' and 1311" respectively and to the MCU 1301 via the SPI connections 1312. Additionally, two multiplexed ADC ports with four channels each, 1313 and 1314 as well as two DACs 1315 and 1316 are connected to the MCU 1301 via the connections 1317 and 1318 respectively. All other components and connections required are symbolized by 1319, 1320, 1321 and 1322. Suitable thermocouple chips are the MAX31855KASA+, a cold-junction compensated thermocouple-to-digital converter. It is designed for a K-element thermocouple sensor with a range from −270° C. to +1372° C. and measures also the internal chip temperature (cold junction). Both the sensor temperature and the internal temperature can be read by a connected MCU via a SPI connection. The module 1300 is powered from an outer source 1323 through the connector 1324 and distributed by the strip 1325. All internal power needed is fed through the strip branch 1326. The strip 1325 is connected to one side of the low ohm resistor 1327 that on the other side is connected to the strip 1328 which in turn is connected to the connector 1329 from which an outer device 1331 can be powered. The voltage drop over the resistor 1327 is measured by an ADC in the MCU through the connection 1330. Thus, the MCU can calculate the current flowing to a device 1331 connected to the connector 1329. The basic software 1332, preferably including CanKingdom, and a serial number, is implemented in a non-volatile part of the MCU memory. Software 1333 can be downloaded in several ways, e.g., via CAN using the CanKingdom protocol and internal timers, comparators, etc.1334 can be utilized by advanced control software. Several types of standard communication dongles can be connected to the USB port 1305, e.g., Bluetooth, Wi-Fi, etc. allowing for remote setup of the module by standard communication devices as PCs, smartphones, etc.

Figure 14:
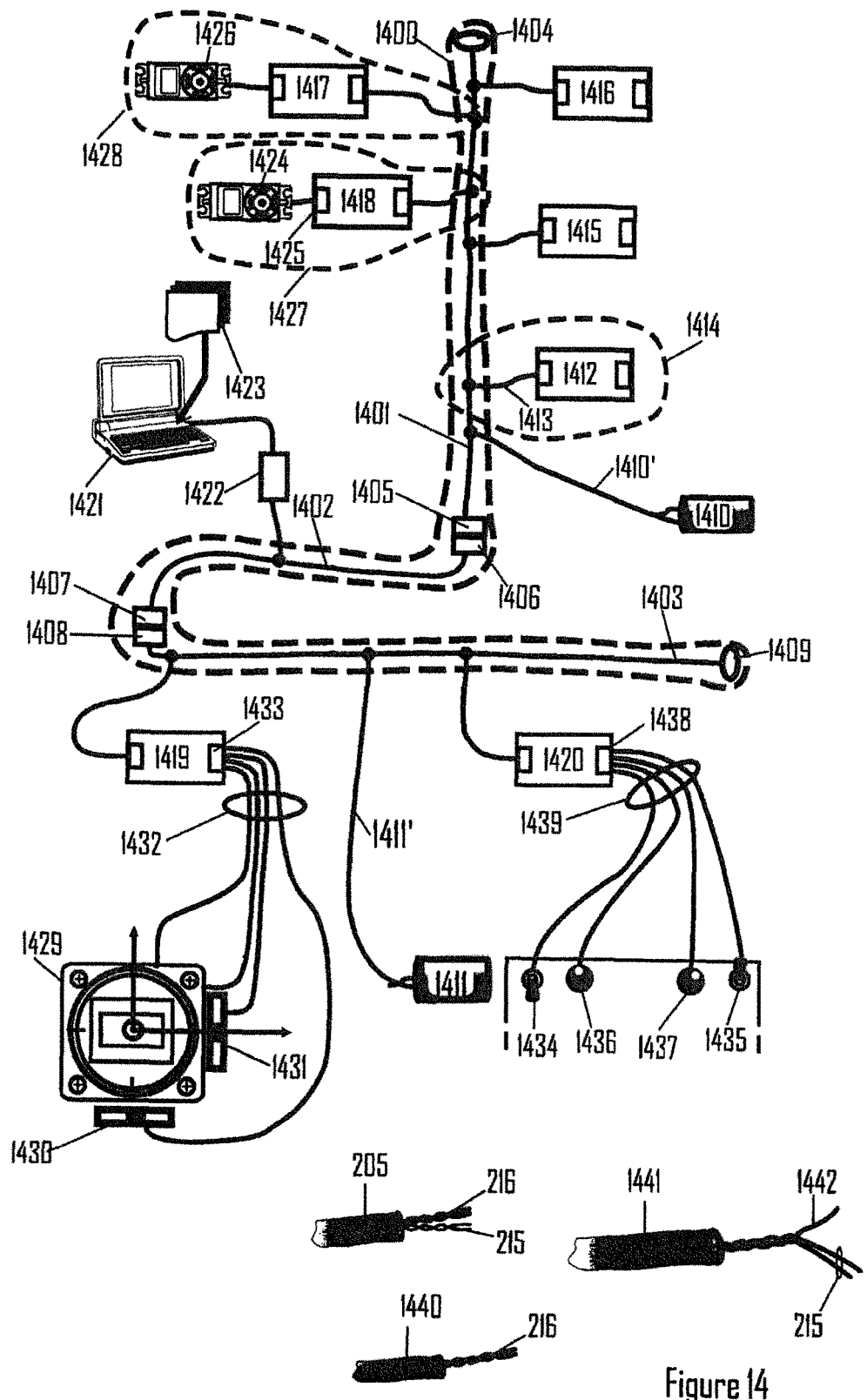
FIG. 14 shows
a first set-up of a system development according to the invention.

Modules as the 1300 just described is very well suited for building function models of distributed embedded control systems based on CAN and related low level protocols as LIN, USB, etc. FIG. 14 shows an example. At a first step is to make a joint CAN bus 1400 consisting of a signal pair 215 and a power pair 216 as previously described as 205. The twisted power pair 216 could alternatively be run in a separate cable 1440 and the signal pair in another cable 1441, then preferably with a separate third conductor 1442 for signal ground. The CAN bus is constructed of three parts; part one 1401, part two 1402 and part three 1403. Part one 1402 is terminated by the resistor 1404 in one end and has a connector 1405 in the other end. Part two 1402 has a connector 1406, mating the connector 1405, in one end and a connector 1407 in the other end. Part three 1403 has a connector 1408, mating connector 1407, in one end and is terminated by the resistor 1409. The CAN bus is powered by the battery 1410 via the connection 1410' and the battery 1411 via the connection 1411'. A module 1412, according to 1300, is connected to the signal pair and power pair of the CAN bus 1401 by the connection 1413 forming a general purpose node 1414 in the CAN system. The modules 1415 through 1420 are connected to the CAN bus in the same way forming general purpose nodes in the system as a first step. A PC 1421 is also connected to the bus via the USB-to-CAN interface 1422. The PC 1421 has a software package 1423 for setting up the nodes within the system, downloading software to the respective module, monitoring and manipulating the CAN traffic, etc. The nodes can then be specified for different purposes. The modules 1417 and 1418 are, by setup messages, modified to control a servo and a servo 1424 is connected to a PWM output 1425 of the module 1418. The servo 1426 is connected in the same way to the module 1417. The system has then two servo nodes 1427 and 1428. The joystick 1429 with the trimmers 1430 and 1431 are connected to the four channel ADC of the module 1419 by the terminal 1433 and the connections 1432. The switches 1434, 1435 and the potentiometers 1436, 1437 are connected to the four channel ADC of the module 1420 by the terminal 1438 and the connections 1439. The modules 1415 and 1416 can be configured in a similar way for other purposes as temperature measuring nodes, GPS nodes, gyro nodes, etc. Extensive testing and modifications of the system and the nodes can be done with the setup according to FIG. 14.

Figure 15:
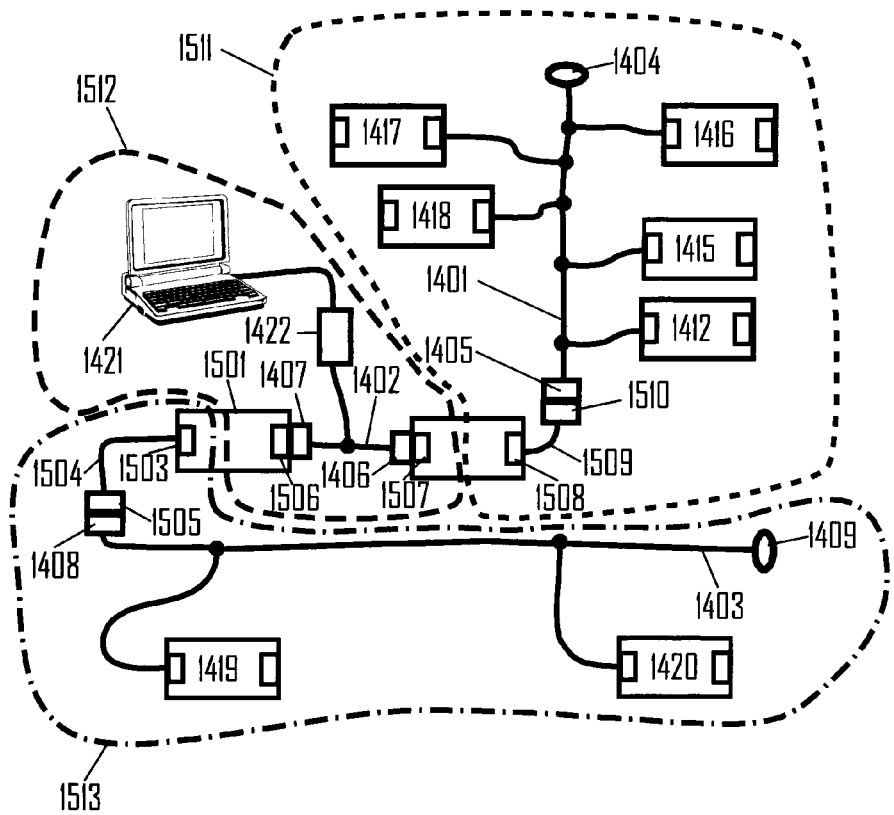
FIG. 15 shows
a second set-up of a system development according to the invention.

FIG. 15 shows a second step of the development of a system as shown in FIG. 14. FIG. 15 shows the same system but here two more modules, 1501 and 1502, are added. These two modules acts as gateways, i.e., both CAN controllers are used. One CAN controller 1503 in the module 1501 is connected to the CAN bus 1403 by the connection 1504 with the connector 1505 mating the connector 1408. The other CAN controller 1506 is connected to the CAN bus 1402 by the connector 1407. One CAN controller 1507 of the module 1502 is connected to the CAN bus 1402 via the connector 1406. The other CAN controller 1508 is connected to the CAN bus 1401 by the connection 1509 and the connector 1510 mating the connector 1405. In this way, three separate CAN systems, 1511, 1512 and 1513, are created. The system 1501 can represent the vehicle system and the system 1513 the transmitter system. The system 1502 represents then a communication between the two other systems. Each system can run on different bit rates, i.e., the respective internal communication can be optimized. The system 1512 can be used to simulate a wireless communication by filtering out the messages from the other two systems that are needed for control interactions as well as their delays. By varying message frequencies and delays in system 1512 as well as control architectures and strategies in the systems 1511 and 1513 respectively, each system 1511 and 1512 can be optimized individually to work together and dependability margins of the systems individually and combined can be verified.

Figure 16:
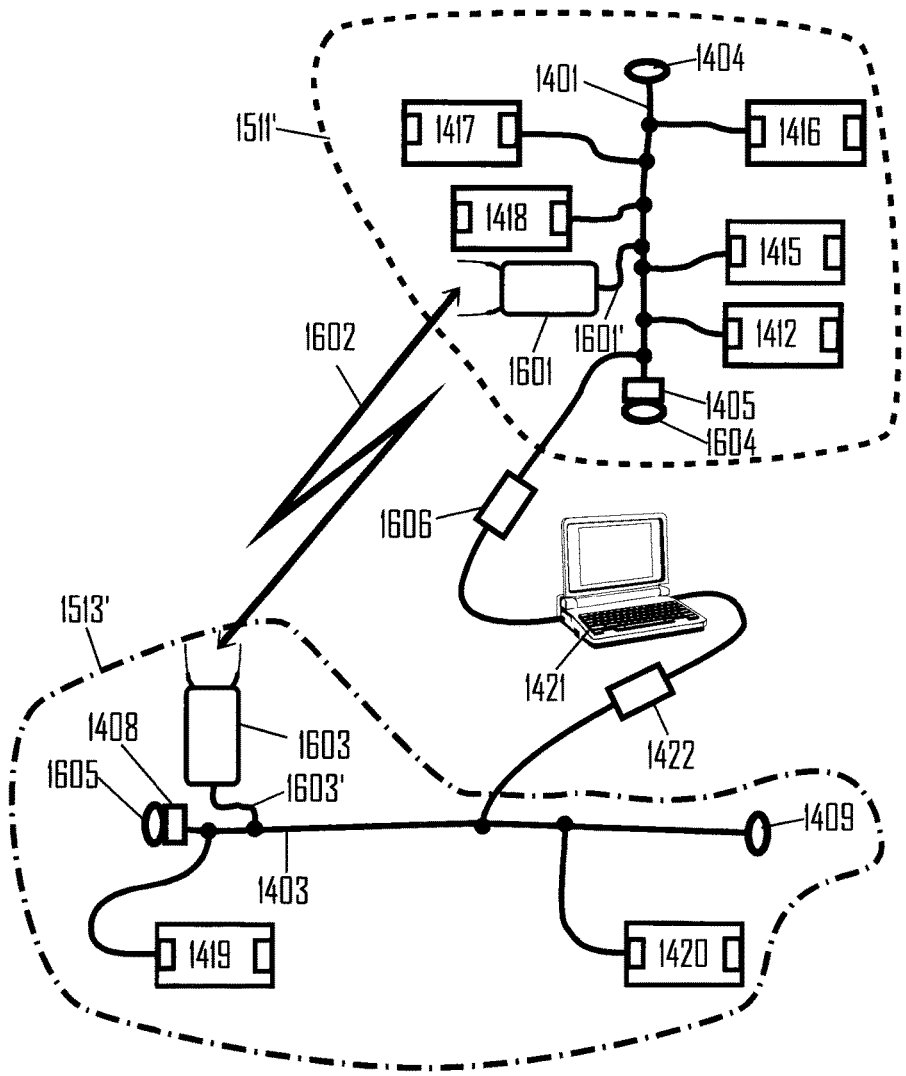
FIG. 16 shows
a third set-up of a system development according to the invention.
Figure 17:
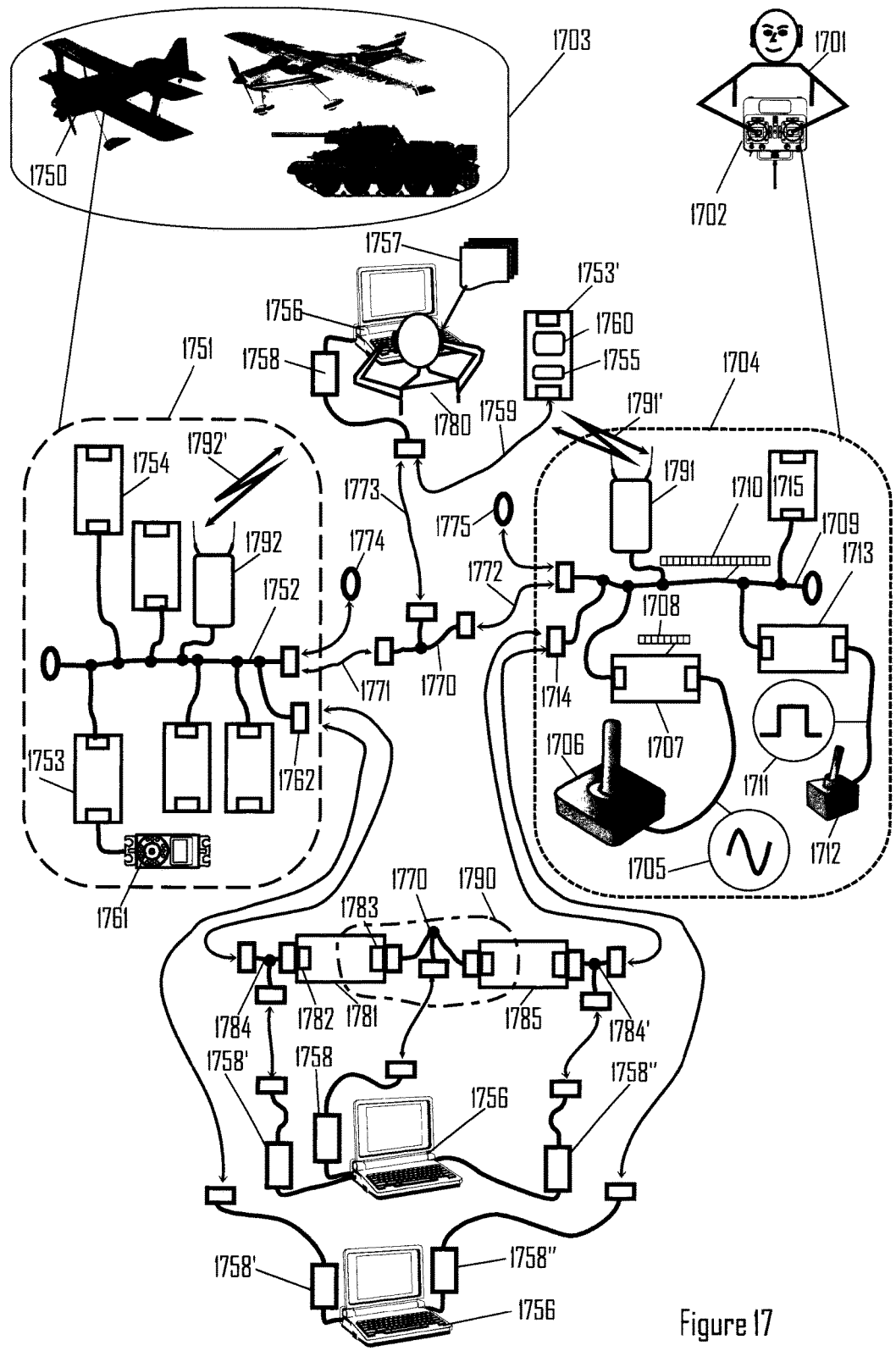
FIG. 17 shows
an overview of the core technology of the invention.

FIG. 16 shows a third step in the development process. Now the intermediate system 1502 is removed and a CAN radio transceiver 1601 (earlier described as 207) is connected to the CAN bus 1401 via the connection 1601' and the CAN bus is terminated by the resistor 1604 connected to the connector 1405 forming the CAN system 1511'. A CAN radio transceiver 1603 is connected to the CAN bus 1403 via the connection 1603' and the CAN bus is terminated by the resistor 1605 connected to the connector 1408 forming the CAN system 1513'. The two systems 1511' and 1513' can now communicate via the radio link 1602. The PC 1421 can be moved and connected to the CAN bus 1403 by the CAN-to-USB interface 1422. A second CAN-to-USB connection 1606 between the PC 1421 and the system 1511' can be added enabling the PC to monitor both systems simultaneously and thus the final combined system 1511' and 1513' can be fully tested and verified.

The invention claimed is:
1. A remote control system suitable for, in a real control context, demonstration and/or teaching, the remote control system (195) comprising:
   a self-propelled mobile device comprising:
      at least one actuator to effect movement of the self-propelled mobile device,
      a transmitter configured to wirelessly transmit information signals regarding the self-propelled mobile device's functions,
      a wired communication network comprising a distributed and integrated network structure (1751) with a bus structure (800) or a star structure (803) that is connected to each of the at least one actuator and the transmitter and configured to provide the information signals within the self-propelled mobile device, and
      a wired or wireless receiving unit configured to receive information signals and operatively connected to the wired communication network;
   a wearable control unit (196) comprising a control device and a transmission system configured to send the information signals;
   wherein the control (324) of the mobile device's functions only takes place in the self-propelled mobile device to enable controls of different and/or multiple mobile devices with only a single one of the wearable control unit.

2. System according to claim 1, wherein the wearable control unit's transmission system further comprises a transmitter unit in operative communication with the control device and configured to:
  convert control signals from the control device into digital form (1708), package the control signals into one or more transmit messages (501) with respective identification portions for respective messages, and
  transmit via a wired or wireless transmission the transmit messages to the wired or wireless receiving unit (1750, 304) for the self-propelled mobile device,
wherein the receiving unit is configured to receive each transmit message and use the respective identification portions and internal rules (1755, 1760) to extract relevant signal portions from the received transmit messages to generate additional messages (601, 602) and/or generate adequate control signals (314) to effect control of the self-propelled mobile device.

3. System according to claim 2, wherein a transmitter (1702) for the wearable control unit comprises a controller area network system (1704).

4. System according to claim 2, wherein the self-propelled mobile device and the wearable control unit can be temporarily connected to each other and/or to a computer (1756) to receive messages from the computer.

5. System according to claim 4, wherein the computer (1756) is arranged connectable to a CAN bus (1770) to modify and/or monitor both the self-propelled mobile device's wired communication network and the wearable control unit's transmission system.

6. System according to claim 2, further comprising a CAN bus (1770) operably connectable to the self-propelled mobile device's wired communication network and the wearable control unit's transmission system.

7. System according to claim 2, further comprising a CAN gateway system (1790) operably connectable to the self-propelled mobile device's wired communication network and the wearable control unit's transmission system.

8. System according to claim 7, wherein the wearable control unit's transmission system, the CAN gateway system (1790), and the self-propelled mobile device's wired communication network operate with different bit rates.

9. System according to claim 7, wherein a computer (1756) is arranged connectable to the CAN gateway system for modification and/or monitoring of the wearable control unit's transmission system, the CAN gateway system, and self-propelled mobile device's wired communication network.

10. System according to claim 2, wherein the self-propelled mobile device and the wearable control unit each comprise a radio transceiver (207, 270).

11. System according to claim 10, wherein the respective radio transceivers are configured to filter out messages from the respective transmission system and wired communication network for radio transmission.

12. System of claim 2, wherein a same transmitter (1702) is interoperable with a plurality of model vehicles (1703) with the same structure and signal composition as the self-propelled mobile device.

13. System of claim 2, wherein the self-propelled mobile device further comprises modules (1753) designed to control actuators (1761) and motor controllers of legacy type and to add new features including one or more of current measurement, voltage measurement, or calculation of output signal based on information from other devices in the self-propelled mobile device.

14. System of claim 13, wherein one or more of the modules integrated in the system has a software structure with various modes wherein switching between modes is executable simultaneously by one command.

15. System of claim 2, wherein the transmission system and the wired communication network operate with different bit rates.

16. System of claim 2, wherein the self-propelled mobile device's transmitter and wired or wireless receiving unit and the wearable control unit's transmission system, which comprises a receiving system, are configured so that communication between the self-propelled mobile device and the wearable control unit is bidirectional.

17. System of claim 2, wherein the self-propelled mobile device comprises a distributed power system.

18. System according to claim 1, wherein the system is connectable via a controller area network (CAN) to a first transmitter (196) connectable to said controller area network and/or a computer connectable to said controller area network.

19. System of claim 1, wherein the self-propelled mobile device comprises both a wired and a wireless receiving unit.

* * * * *